United States Patent

Barreto, III et al.

[11] Patent Number: 5,136,981
[45] Date of Patent: Aug. 11, 1992

[54] PET BED

[76] Inventors: Aurelio F. Barreto, III, 20455 Somma Dr., Lake Mathews, Calif. 92570; Darrell R. Paxman, 7186 Calico Cir., Corona, Calif. 91719

[21] Appl. No.: 738,587

[22] Filed: Jul. 31, 1991

[51] Int. Cl.[5] .............................................. A01K 29/00
[52] U.S. Cl. ................................... 119/28.5; D30/118
[58] Field of Search ................... 119/174, 28.5; 5/424, 5/425, 99.1; D30/118

[56] References Cited

U.S. PATENT DOCUMENTS

| | | | |
|---|---|---|---|
| 45,392 | 3/1914 | Matthai | D30/1 |
| D. 224,934 | 10/1972 | Gilstrap | D30/1 |
| D. 225,121 | 11/1972 | Mashburn | 119/28.5 |
| D. 246,540 | 11/1977 | Burleson | D30/1 |
| 1,029,144 | 6/1912 | Rich | 119/19 |
| 1,126,333 | 1/1915 | Adams | 454/358 |
| 3,147,736 | 9/1964 | Daniel | 119/19 |
| 3,565,040 | 2/1971 | Pohl | 119/1 |
| 3,814,058 | 6/1974 | Thompson | 119/19 |
| 3,902,456 | 9/1975 | David | 119/1 |
| 3,989,008 | 11/1976 | Neumann | 119/1 |
| 4,008,687 | 2/1977 | Keys | 119/1 |
| 4,010,880 | 3/1977 | Guillot - Munoz | 224/42.42 A |
| 4,057,031 | 11/1977 | Williams et al. | 119/1 |
| 4,729,343 | 3/1988 | Evans | 119/19 |
| 4,763,604 | 8/1988 | Meekins | 119/1 |
| 4,860,689 | 8/1989 | Stewart | 119/1 |
| 4,899,693 | 2/1990 | Arnold | 119/28.5 |
| 5,000,116 | 3/1991 | Fife et al. | 119/28.5 |
| 5,002,014 | 3/1991 | Albin | 119/28.5 |
| 5,010,843 | 4/1991 | Henry | 119/28.5 |
| 5,027,748 | 7/1991 | Wolak | 119/168 |
| 5,033,408 | 7/1991 | Langenbabu | 119/28.5 |

FOREIGN PATENT DOCUMENTS

| | | | |
|---|---|---|---|
| 2514990 | 4/1983 | France | 119/28.5 |
| 955581 | 4/1964 | United Kingdom | 119/28.5 |

Primary Examiner—John G. Weiss
Attorney, Agent, or Firm—Cassidy, Vance & Tarleton

[57] ABSTRACT

Apparatus and methods for providing soft padded bedding for pets, such as for cats and dogs. The invention comprises: a flexible foam-core sidewall; a flexible foam-core base; and a cover having a sidewall enclosure, a separate base enclosure, and a floor, the sidewall enclosure capable of at least partially enclosing the sidewall, and the base enclosure capable of at least partially enclosing the base. The invention may also be configured to have a general appearance of a boat or one of several different tepees.

19 Claims, 14 Drawing Sheets

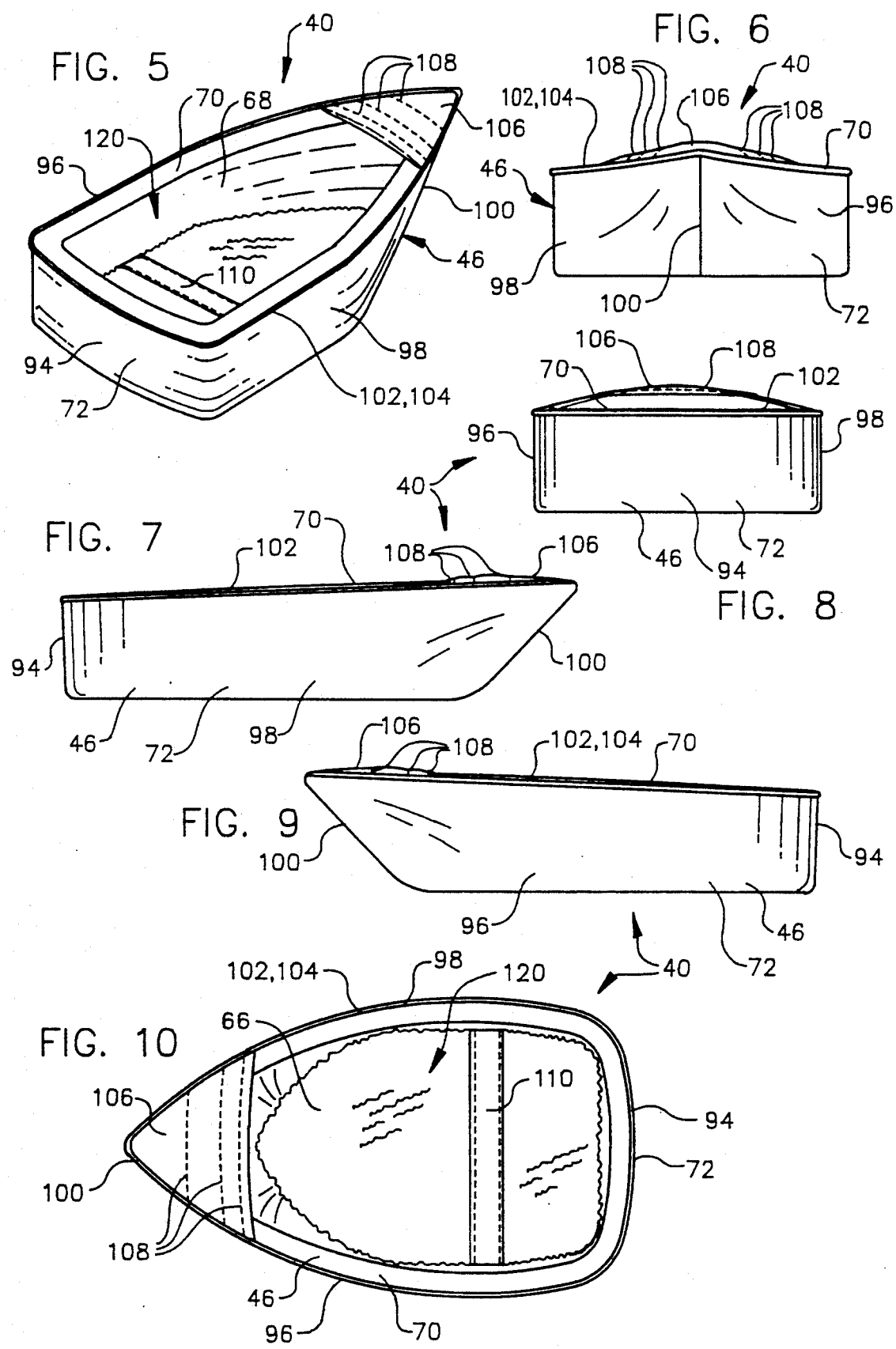

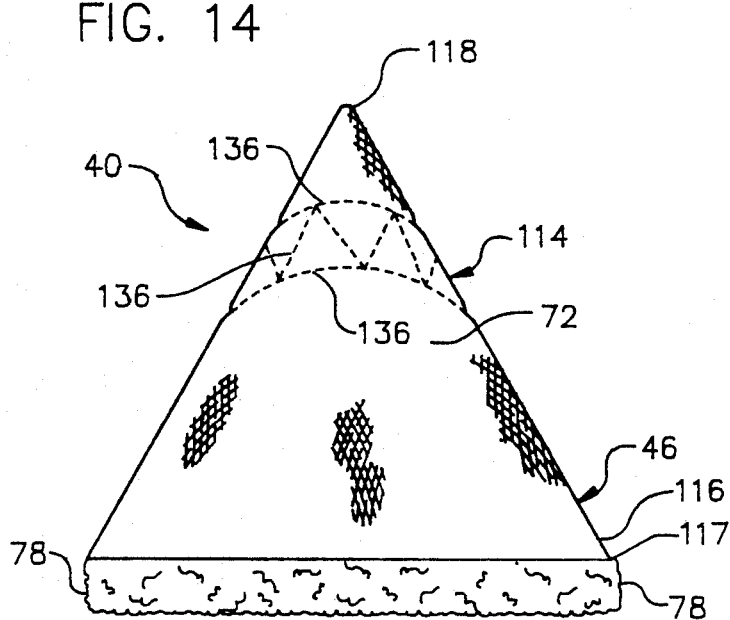
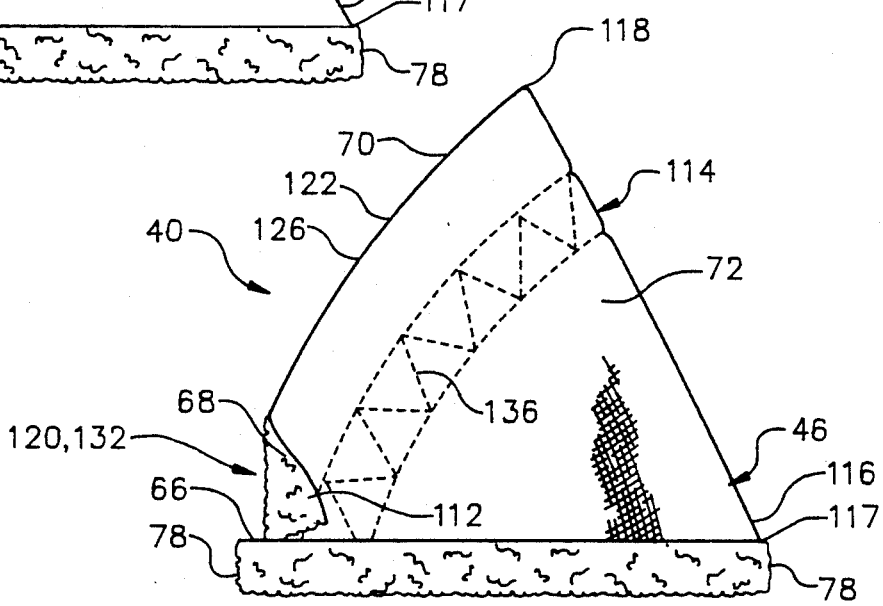
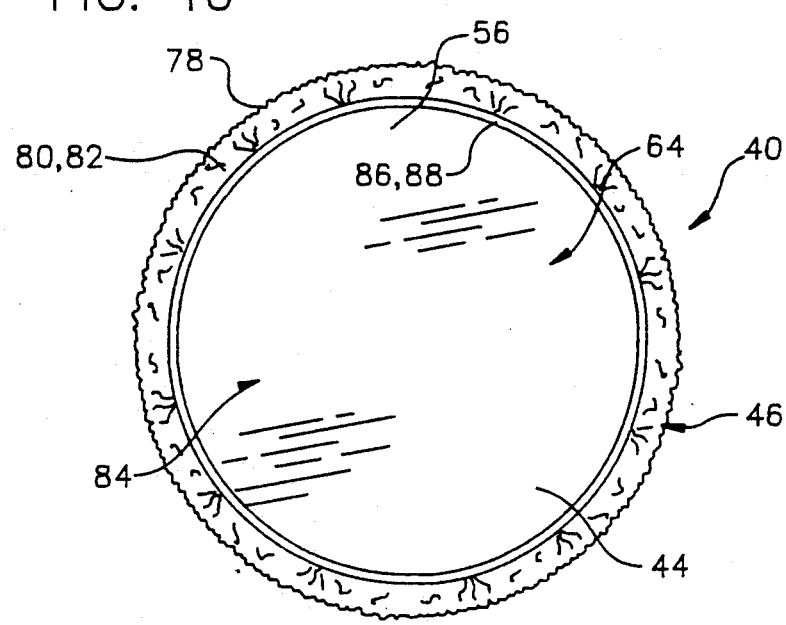

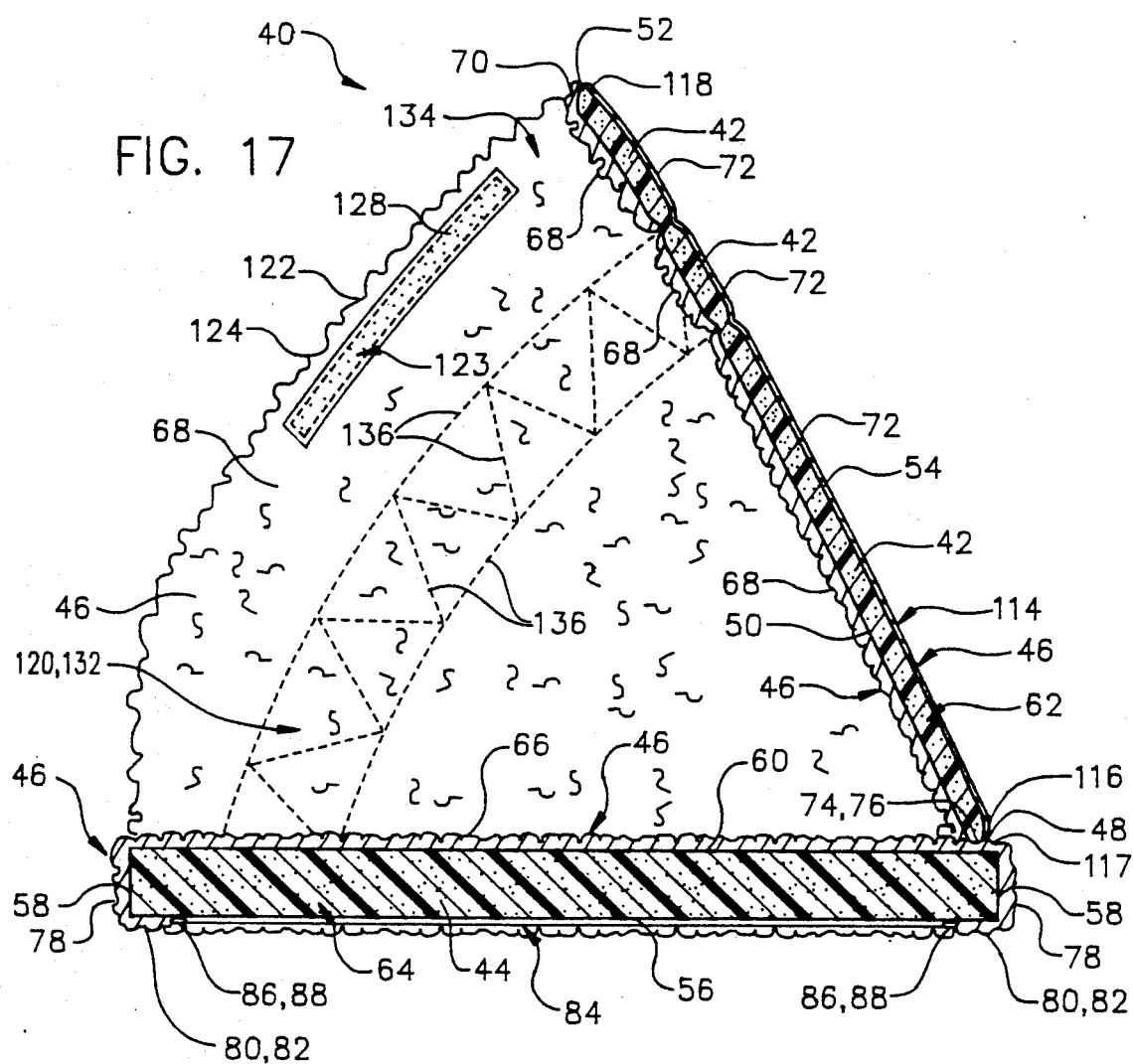
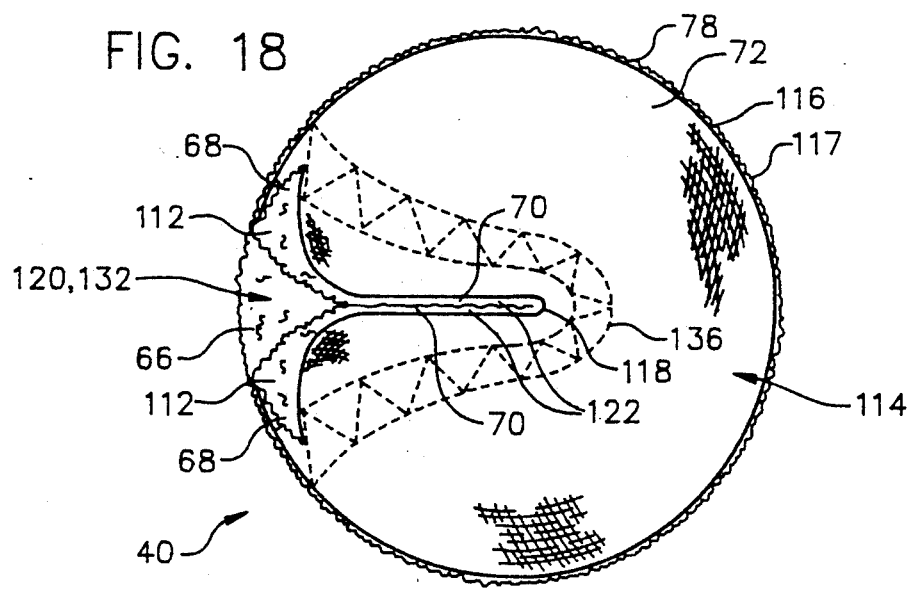

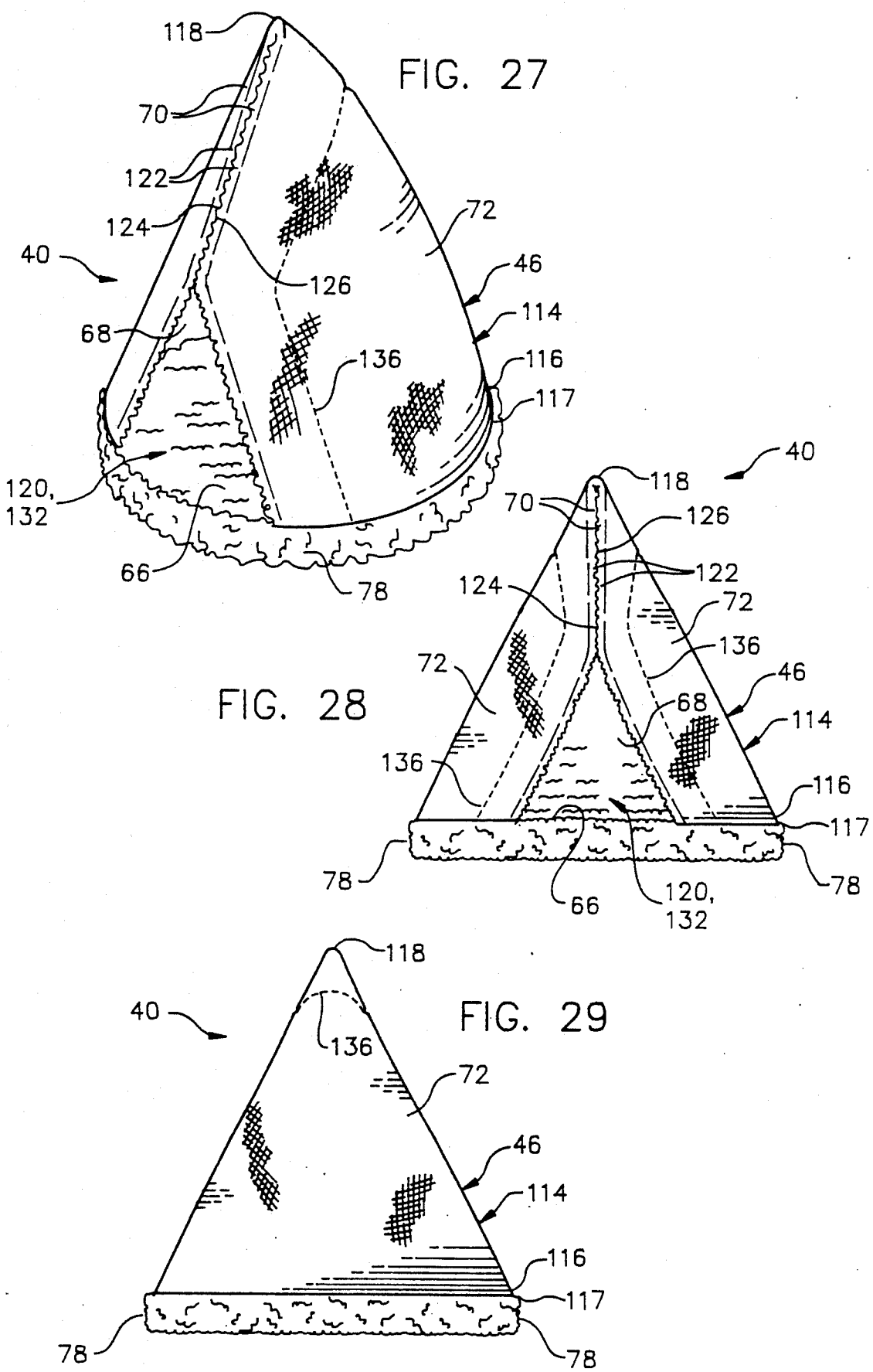

PET BED

COPYRIGHT NOTICE

©Copyright 1991, Cassidy, Vance & Tarleton, P.S. All Rights Reserved.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNICAL FIELD

This invention relates to apparatus and methods for providing soft, padded bedding and shelter for pets, and particularly for cats and dogs.

BACKGROUND OF THE INVENTION

For decades manufacturers of pet products have recognized a need to provide a safe and comfortable environment for pets, and particularly for cats and dogs. A myriad of different forms of shelters, bedding, clothing, exercise equipment, toys, food, and health products for pets have been developed with safety and comfort in mind.

One of the most widely used padded bedding products is a simple fabric or vinyl bag which contain wood chips, foam chips, rags, or other material. When sat upon, the chips or rags are displaced to form an indented cradle within which a pet may rest.

Another type of pet bed comprises a unitary flexible foam core structure having a sidewall which is permanently adhered to a base. It is important to note that the base is not removable from the sidewall. Rather, the base and sidewall are permanently joined to give the pet bed structural integrity. A cradle is formed between the inner, upwardly extending surfaces of the sidewall and the upper surface of the base. The foam core structure is then covered and protected by a removable, washable cover.

The washable cover, which defines a single enclosure, is simply slid over the foam core structure defined by the sidewall and base. The cover does not supply any structural support for the bed. Instead, the cover is simply intended to cover and protect the exposed surfaces of the foam core structure. Consequently, the cover material is loosely laid upon the upper surfaces of the base and is limp and slack. This design is devoid of any means to place tension within the cover material which lays upon the upper surfaces of the base. The slack nature of the cover, causes such a pet bed to be rather unsightly and unappealing when placed upon a store shelf and when used by a pet within a home.

Another pet bed comprises a permanently joined, unitary cover and flexible core structure. The cover material is literally sewn onto the foam base and side walls and is not removable therefrom. The base and sidewall are thus permanently enveloped or enclosed within the cover. This type of pet bed is extremely difficult and expensive to manufacture and does not permit the cover to be removed for cleaning or replacement.

Another pet bed comprises a combination of the foregoing elements, wherein a sidewall cover permanently encases a flexible foam core sidewall. Attached to lower edges of the sidewall cover is a thin sheet of cloth material which defines a nonpadded floor. A separate base cover permanently encases a stuffed pillow or pad. The covered pad is then tossed onto the nonpadded floor within the cradle formed by the covered sidewall. This product requires the manufacture and use of two separate covers. The foam core sidewall and base are permanently encased within their respective covers. This type of pet bed is also extremely difficult and expensive to manufacture and does not permit only the cover to be removed for cleaning or replacement.

The above-mentioned bed products have other inherent difficulties. For example, it is not uncommon that a pet will urinate within the bedding or otherwise soil it. If a unitary core structure is used or if the cover is permanently attached to the core structure, the structure is almost impossible to wash within a conventional, household washing machine. The difficulty arises due to the bulk, size, and unitary structure of the product.

If the bedding is not washed, the soiled and contaminated cover and foam core structure become cold, damp, wet, and dirty. Insects, mildew, and bacteria can harbor within the bedding and thereby expose the pet to a severe health hazard.

Bedding having a unitary or permanently attached core structure and/or multiple covers is also more difficult and expensive to manufacture, package, and ship. For example, the bulky, three-dimensional nature of the bed slows down the manufacturing process and increases manufacturing expense. The large three-dimensional nature of the bed also consumes a large amount of storage and shelf space. This necessitates the use of larger shipping packages and crates for shipment, and increased shipping fees.

Other problems with the apparatus and methods of the prior art include: the need to adhere the sidewall to the base to give the apparatus structural support; or alternatively, the need to stitch the cover directly to the flexible, yet thick, foam core.

The following issued patents describe other types of cloth or padded pet enclosures and/or bedding: Pohl (U.S. Pat. No. 3,565,040, issued Feb. 23, 1971); David (U.S. Pat. No. 3,902,456, issued Sep. 2, 1975); Neumann (U.S. Pat. No. 3,989,008, issued Nov. 2, 1976); Keys (U.S. Pat. No. 4,008,687, issued Feb. 22, 1977); Guillot-Munoz (U.S. Pat. No. 4,010,880, issued Mar. 8, 1977); Meekins (U.S. Pat. No. 4,763,604, issued Aug. 16, 1988); and Stewart (U.S. Pat. No. 4,860,689, issued Aug. 9, 1989).

The inventor believes that the listed products and patents taken alone or in combination neither anticipate nor render obvious the present invention. These citations do not constitute an admission that such disclosures are relevant or material to the present claims. Rather, these citations relate only to the general field of the disclosure and are cited as constituting the closest art of which the inventor is aware.

DISCLOSURE OF INVENTION

Most pet owners desire that their beloved pets are kept healthy and made as comfortable as possible. Heretofore, the soft, padded, pet bedding and shelters that were available to such owners were often bulky, untidy, unsightly, unattractive, and difficult to clean.

This invention is an improved soft, padded pet bed and shelter that is easily assembled, disassembled and washed, and is not unduly bulky. The various embodiments of this invention are specifically designed to retain a tidy, attractive, clean, and aesthetically-appealing professional appearance. The various designs of this invention were generated from a consideration of not only the anatomical but also the psychological well being of the pet. For example, both dogs and cats must be provided with sufficient space to allow movement upon the bedding or within the enclosure. This space is needed because such animals will often change their sleeping positions for greater comfort. The space, however, must not be too large. Most pets appear to enjoy resting in a soft, clean, warm, protected, enclosed environment which have some form of a sidewall against which the pet may lean. Cats also like to tumble and climb, consequently, the below mentioned tepee design has been created to partially meet this need.

These benefits for the pet are coupled with an advantageous structure that enables the cover and base to be separated for cleaning and storage. The sidewall is not adhered to the periphery edges of the base. Consequently, the sidewall may be folded against itself for insertion into a washing machine or into a relatively flat carton for shipping or storage. If needed, the base may be similarly folded.

In short, this invention is simple, functional, efficient, reliable, rugged, durable, compact, and is easily used, constructed and assembled. The present invention is also inexpensive and economical to manufacture, and is extremely simple to use requiring minimal manipulation for assembly and disassembly.

To achieve these general and specific objectives the pet bed of the present invention generally comprises a sidewall, a base, and a cover.

It is intended that the sidewall and base are made of a soft, flexible, foam-core material, such as foam rubber or the like which are commonly used for the manufacture of mattresses and cushions.

Alternatively, the base and/or sidewall may comprise a hollow structure made of polyethylene, polypropylene, or similar material. Such a hollow structure could be formed by several different processes, including blow molding, rotational molding, vacuum molding, or injection molding. For example, the base could comprise a blow-molded, hollowcored structure wherein a generally horizontal base floor is raised above an underlying support surface and is suspended from generally upright base sidewalls located about the perimeter of the base floor. Since the base floor material is capable of flexing, this alternative structure provides not only insulating and weight-supporting characteristics but also provides a forgiving, shock absorbent base floor for the invention. This alternative structure is also more easily washed than a base made from a foam-core material.

The sidewall may be made of a single section or piece of foam which is generally continuous about at least a portion of a periphery of the pet bed. The sidewall serves as a wall against which the pet may lean.

The base serves as a mattress or cushion to insulate the pet from the underlying support surface. The base generally has an upper surface and a lower surface.

The cover generally covers and protects the sidewall and the base. The cover of the present invention is unique, however, in that it has a sidewall enclosure and a separate, independent base enclosure. The sidewall enclosure is capable of at partially enclosing the sidewall. The base enclosure is capable of at least partially enclosing the base.

The base is separable and removable from the base enclosure of the cover and, similarly, is insertable therein. The base is also separable from the sidewall of the invention. Removal of the base from the base enclosure enables the sidewall, when so urged, to collapse upon itself within the sidewall enclosure to assume a generally flat compact form.

The cover is preferably made of a washable material. For example, a portion or all of the cover could be made of a nylon, denim, and/or vinyl fabric. Portions of the cover could also be made of a synthetic material which simulates fur, such as an artificial sheepskin fabric.

The cover has a floor upon which the pet rests. The floor is generally stretched taut across the upper surface of the base when the base is properly inserted and positioned within the base enclosure. The lower surface of base may be placed upon the underlying support surface to be coplanar therewith.

The design of the cover also urges the sidewall of the invention to have a generally upright orientation with respect to the support surface and the base.

To maintain a taut condition, the cover may also be provided with a length of elastic material which is positioned about the perimeter of an opening to the base enclosure. The elastic material urges the opening toward at least a partial closure. Expansion of the elastic material enlarges the opening to enable the base to be removed from or inserted into the base enclosure. Thus, the cover is form fitted onto the sidewall and base.

Using the aforementioned concepts, a wide variety of differently configured pet beds can be manufactured. For example, the base, sidewall, and cover may be configured to create a pet bed having a generally circular or oval cradle or pet enclosure. A portion of the sidewall may be lower in height, as measured from the base or support surface, than a remaining portion of the sidewall. If used, this lower portion defines an entrance into the cradle or pet enclosure.

Alternatively, the pet bed may have a general appearance or configuration of a boat. The pet be may also have a general appearance or configuration of a wide variety of differently designed tepees or wigwams having an inverted, cone shape. Use of piping, a foredeck, functional and/or ornamental stitching, bands of decorative material, door flaps, and badges, ribbons, decals, or other indicia may be used to give the pet bed an attractive, aesthetically appealing appearance.

The present invention achieves each of the above-stated objectives and also overcomes the previously mentioned disadvantages of the prior art.

These and other objectives and advantages of the present invention will become more readily apparent upon reading the following disclosure and referring to the attached drawings.

BRIEF DESCRIPTION OF DRAWINGS

FIG. 5 is a perspective view of a second embodiment of the invention as taught herein.

FIG. 6 is a front-elevational view of the second embodiment shown in FIG. 5.

FIG. 7 is a starboard side-elevational view of the second embodiment shown in FIG. 5.

FIG. 8 is a back-elevational view of the second embodiment shown in FIG. 5.

FIG. 9 is a port side-elevational view of the second embodiment shown in FIG. 5.

FIG. 10 is a top, plan view of the second embodiment shown in FIG. 5.

FIG. 14 is a back-elevational view of the third embodiment shown in FIG. 12.

FIG. 15 is a side-elevational view of the third embodiment shown in FIG. 12.

FIG. 16 is a bottom, plan view of the third embodiment shown in FIG. 12.

FIG. 17 is a cross-sectional, side-elevational view of the third embodiment shown in FIG. 12 taken along line XVII—XVII in FIG. 13.

FIG. 18 is a top, plan view of the third embodiment shown in FIG. 12.

FIG. 27 is a perspective view of a fifth embodiment of the invention as taught herein.

FIG. 28 is a front-elevational view of the fifth embodiment shown in FIG. 27.

FIG. 29 is a back-elevational view of the fifth embodiment shown in FIG. 27.

Figure 1:
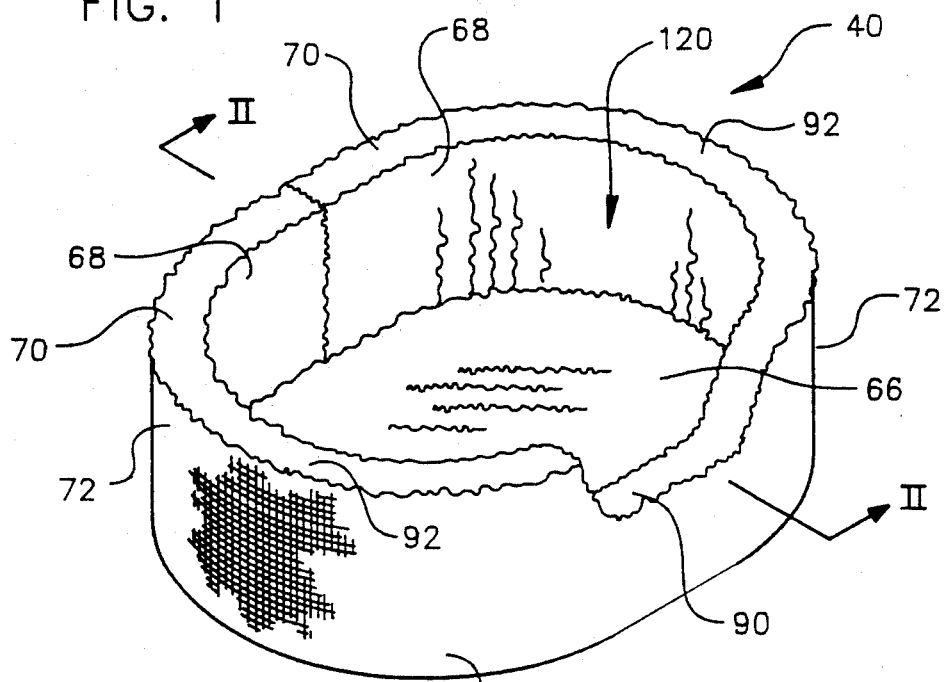
FIG. 1 is a perspective view of a first embodiment of the invention as taught herein.

One should understand that the drawings are not necessarily to scale and the elements are sometimes illustrated by graphic symbols, phantom lines, diagrammatic representations, and fragmentary views. In certain instances, the inventor may have omitted details which are not necessary for an understanding of the present invention or which render other details difficult to perceive.

BEST MODE FOR CARRYING OUT THE INVENTION

Referring to the drawings, wherein like numerals indicate like parts, FIGS. 1 through 4 illustrate a first embodiment of the present invention. FIGS. 5 through 11, and 40 illustrate a second embodiment of the invention. FIGS. 12 through 20 illustrate a third embodiment of the invention. FIGS. 21 through 26 illustrate a fourth embodiment of the invention. FIGS. 27 through 32 illustrate a fifth embodiment of the invention. FIGS. 33 through 39 illustrate a sixth embodiment of the invention. For simplicity in comparing common features of each embodiment, similar reference numerals have been used.

Referring now to the first embodiment, a padded pet bed 40 is used to insulate a pet (not shown) from an underlying support surface (not shown). Pet bed 40 generally comprises a sidewall 42, a base 44, and a cover 46.

Base 44 serves as a cushion to support and insulate the pet from the support surface. Sidewall 42 is secured to base 44 and provides a perimeter wall to define a partial enclosure or cradle within which the pet may find comfort and solitude. Pets often use sidewalls of their shelters to lean against.

Sidewall 42 and base 44 may be made of a soft, flexible foam-core material, such as an open-cell or closed-cell foam rubber, or similar material, having a thickness of about one-quarter to six inches ($\frac{1}{4}$" to 6"). The thickness of sidewall 42 and base 44 is dependent upon the size and weight of the pet, and the particular configuration of embodiment selected.

Alternatively, in some embodiments sidewall 42 and/or base 44 may be made with a hollow structure made of polyethylene, polypropylene, or similar material. Such a hollow structure could be formed by several different processes, including blow molding, rotational molding, vacuum molding, or injection molding. Since such a structure is hollow, the floor and sidewall of the structure are capable of flexing. This alternative structure provides insulating, weight-supporting, and shock absorbent characteristics, but in addition is more easily washed than foam-core materials. This molded structure may even serve as a more durable replacement mattress if the foam-core base 44 as described herein becomes excessively soiled or worn.

Figure 2:
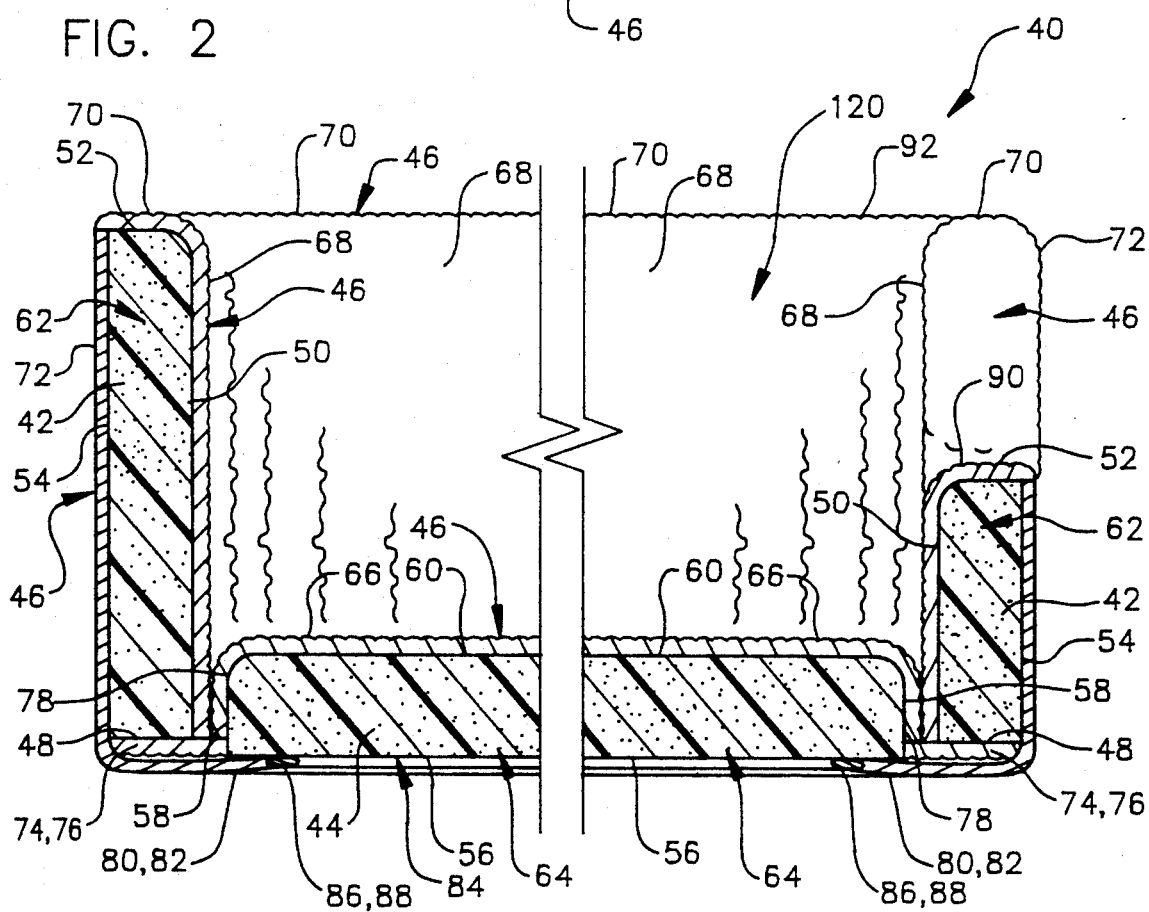
FIG. 2 is a cross-sectional, side-elevational view of the first embodiment taken along line II—II in FIG. 1.
Figure 3:
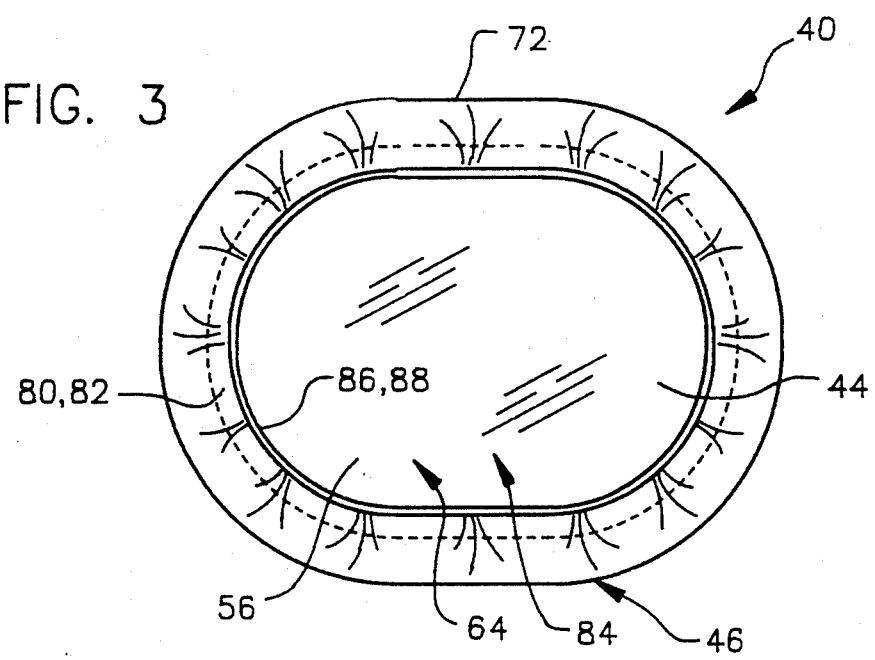
FIG. 3 is a bottom, plan view of the first embodiment shown in FIG. 1.
Figure 4:
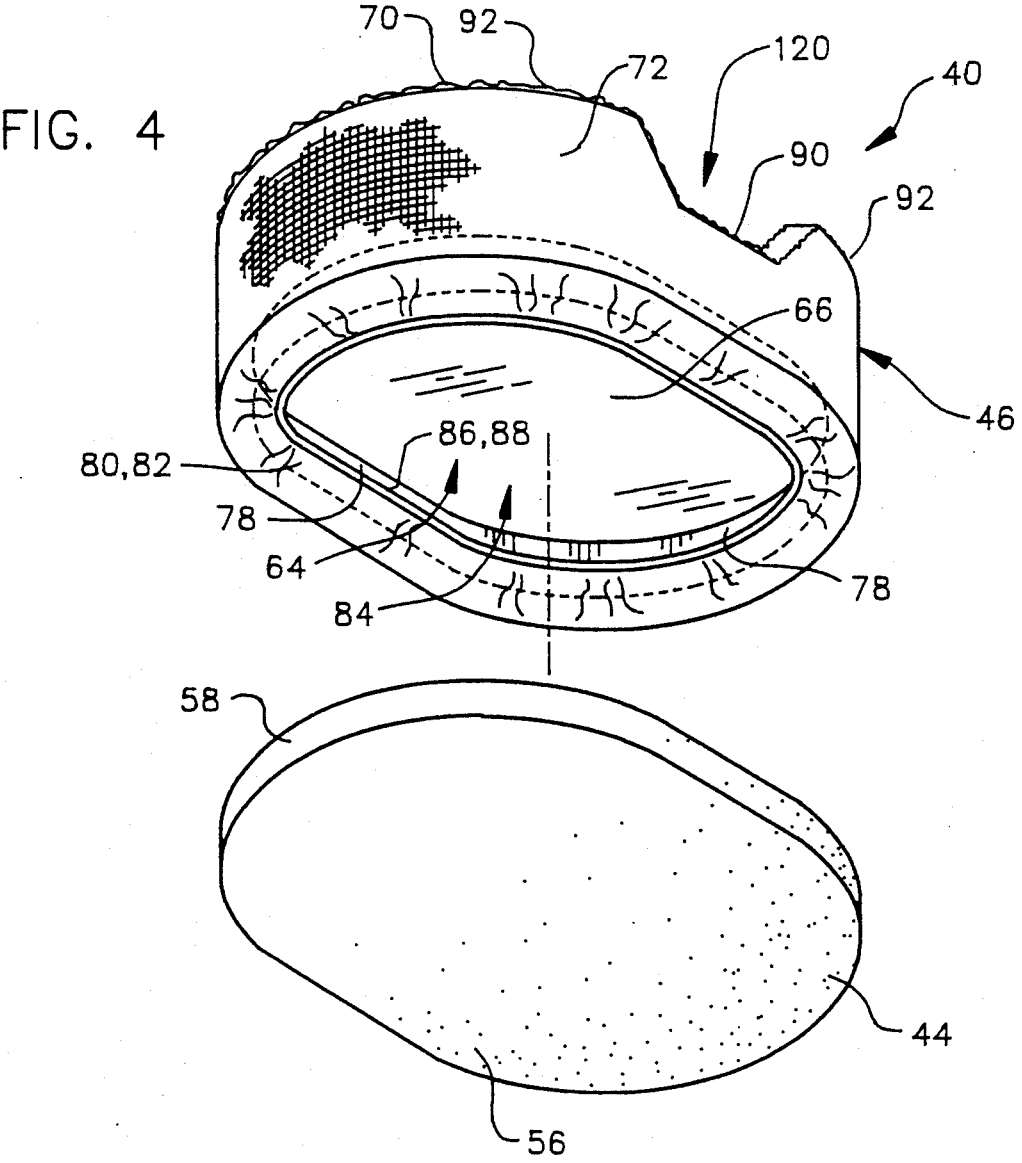
FIG. 4 is an exploded-perspective view of the first embodiment shown in FIG. 1 illustrating the removal and insertion of the base into the base enclosure of the cover.
Figure 11:
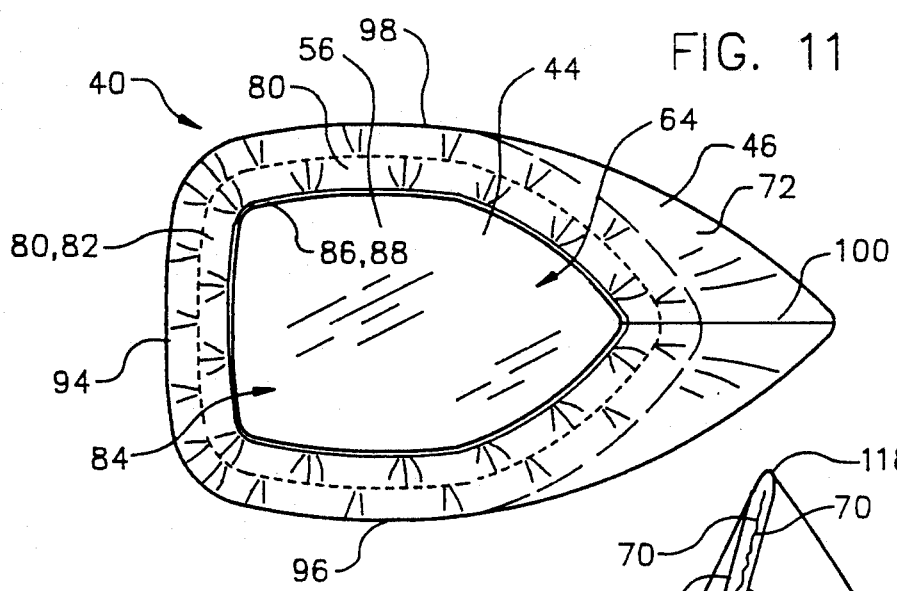
FIG. 11 is a bottom, plan view of the second embodiment shown in FIG. 5.
Figure 12:
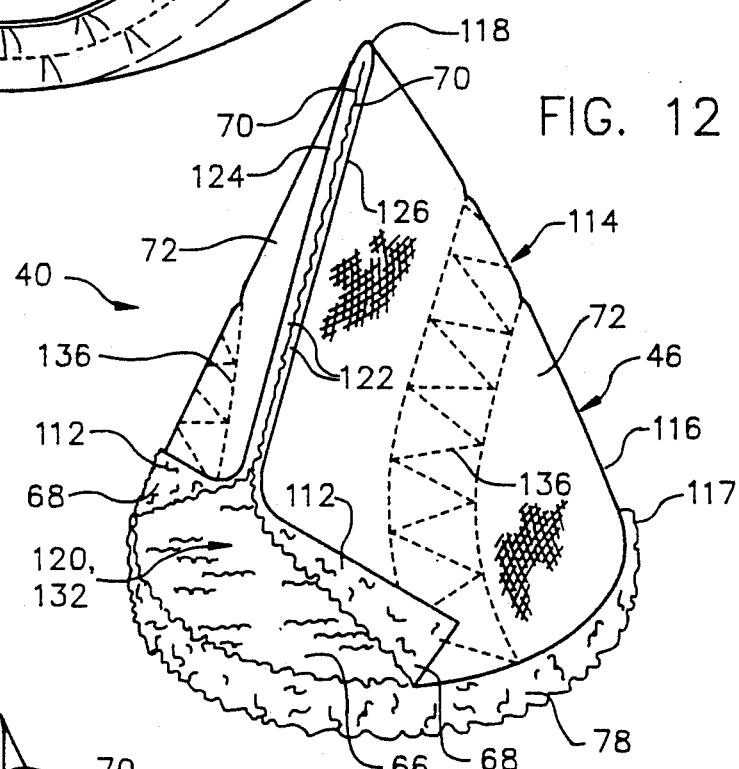
FIG. 12 is a perspective view of a third embodiment of the invention as taught herein with a first and second leading edge of a sidewall being joined to generally close an opening of an interior pet enclosure.
Figure 13:
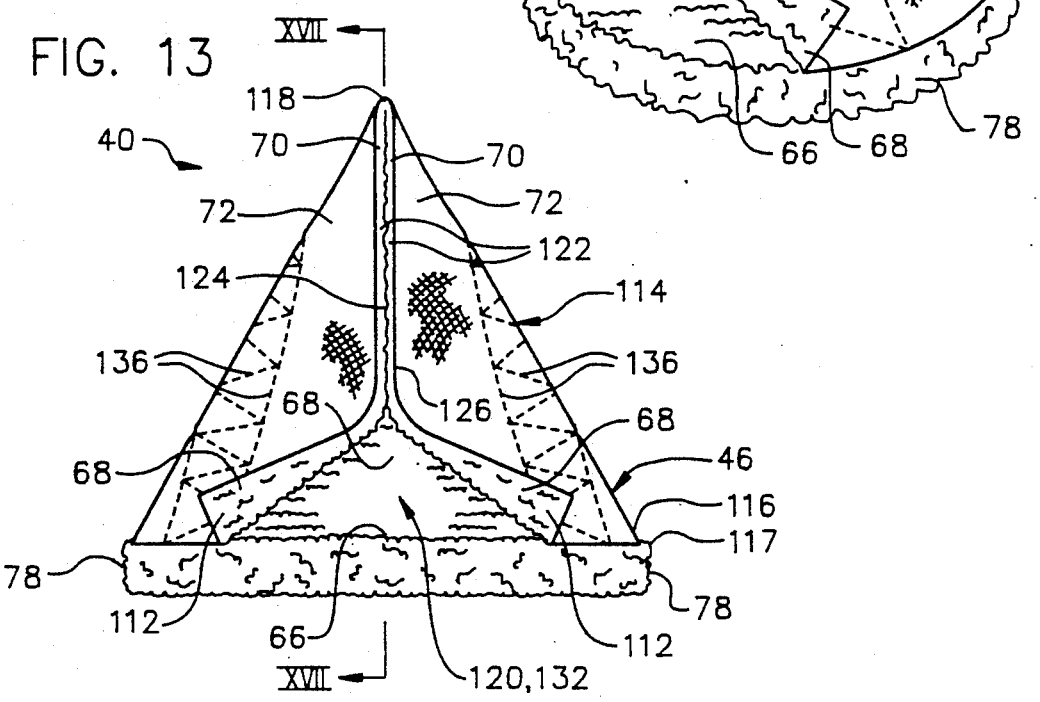
FIG. 13 is a front-elevational view of the third embodiment shown in FIG. 12.

As best seen in FIG. 2, sidewall 42 has a lower side 48, an interior side 50, a top side 52, and an outer side 54. Similarly, base 44 has a lower surface 56, a side surface 58, and an upper surface 60.

Sidewall 42 may comprise a plurality of joined sections or, as preferred, a single section of foam which is generally continuous about a periphery of pet bed 40. Although not preferred, base 44 may also be made of a plurality of joined sections.

Cover 46 generally covers and protects sidewall 42 and base 44 against becoming soiled. Cover 46 preferably is made of a flexible material than can be washed. The inventor prefers to make cover 46 out of a nylon, denim, or vinyl fabric, or a combination of these materials. Cover 46, or a portion thereof, may also be made from a natural or synthetic material which depicts or simulates fur. For example, many surfaces of cover 46 are illustrated as being made of an artificial sheepskin fabric.

It is important to note the structure and function of cover 46. As best seen in FIG. 2, cover 46 comprises a sidewall enclosure 62, a separate base enclosure 64, and a floor 66. Sidewall enclosure 62 is capable of at least partially enclosing sidewall 42. Base enclosure 64 is capable of at least partially enclosing base 44.

More particularly, sidewall enclosure 62 has an interior wall covering 68, a top wall covering 70, an outer wall covering 72, and means 74 for securing sidewall 42 within sidewall enclosure 62. Interior wall covering 68 covers and protects interior side 50. Top wall covering 70 covers and protects top side 52. Outer wall covering 72 covers and protects outer side 54. Securing means 74 may comprise a lower wall covering 76 that is permanently secured in place, may be opened, and/or is removable from cover 46 possibly to allow for the removal of sidewall 74 from within sidewall enclosure 62. It is not required that sidewall 74 be removable from within sidewall enclosure 62. In fact, for easy assembly by an end consumer, it is intended that sidewall 74 be already inserted into sidewall enclosure 62 prior to shipping, as will be described further below.

Base enclosure 64 has floor 66, a base wall 78, and means 80 for securing base 44 within base enclosure 64. Floor 66 covers and protects upper surface 60. Base wall 78 covers and protects side surface 58. Securing means 80 may comprise a lip 82 or flange of material extending inwardly from base wall 78, from lower wall covering 76, or from outer wall covering 72 which extends at least about the periphery of base 44 to catch and retain at least a portion of lower surface 56. Securing means 80 also defines an opening 84 into base enclosure 64.

Please note that base enclosure 64 is separate and apart from sidewall enclosure 62, and base 44 is separable and removable from cover 46 and from sidewall 42.

Cover 46 may further comprise a length of elastic material 86 affixed to securing means 80 about an edge 88 of opening 84. Elastic material 86 urges opening 84 toward at least a partial closure. Expansion of elastic material 86 enlarges opening 84 to allow base 44 to be removed from or inserted into base enclosure 64.

Cover 46 holds and retains sidewall 42 and base 44. When sidewall 42 is positioned within sidewall enclosure 62 and base 44 is positioned within base enclosure 64, cover 46 imparts structural integrity to pet bed 40 by not only joining and unifying cover 46, sidewall 42, and base 44, but also urging sidewall 42 to have a generally upright orientation with respect to base 44.

When pet bed 40 is properly placed upon the support surface, base 44 is generally coplanar with the support surface and sidewall 42 extends upwardly from either the support surface or from base 44.

Many different pet bed products were discussed above in the Background Of The Invention. Of such products having a sidewall and a removable cover, the cover simply slides over and covers the exposed surfaces of the foam core structure. Such a cover does not supply any structural support for the pet bed. Consequently, the cover is loosely laid upon the upper surfaces of the pet bed mattress and is limp and slack. Such pet bed products are devoid of any means to place tension within the cover that lays upon the upper surfaces of the base. The slack nature of the cover causes the pet bed to be rather unsightly and unappealing when placed upon a store shelf and when used by a pet within a home.

In stark contrast to the aforementioned pet bed products, when base 44 of the present invention is properly positioned within base enclosure 64 of cover 46, floor 66 is generally stretched taut across upper surface 60 giving pet bed 40 a clean, tidy, appealing, and professional appearance.

Removal of base 44 from within base enclosure 64 enables sidewall 42, when so urged, to collapse upon itself within sidewall enclosure 62 to assume a generally flat compact form. Thus, base 44 and the collapsed, combined sidewall 42 and cover 46 may be packaged, shipped, and stored as a relatively thin, flat product.

The foregoing description is applicable to each of the illustrated embodiments. Structure, features, and elements specific to individual embodiments will now be described in detail.

The first embodiment of pet bed 40 is illustrated in FIGS. 1 through 4. As shown, sidewall 42 imparts a general appearance of a circular or oval cradle to pet bed 40. A portion 90 of sidewall 42 may be lower in height as measured from base 44 or from the support surface than a remaining portion 92 of sidewall 42. Lower portion 90 defines an entrance into the cradle or pet enclosure.

The second embodiment of pet bed 40 is illustrated in FIGS. 5 through 11, and 40. The main concepts and structure as taught above are included within the second embodiment. One striking exception, however, is that cover 46, sidewall 42, and base 44 give pet bed 40 a general appearance or configuration of a boat. Sidewall 42 generally forms a stern freeboard 94, a port freeboard 96, a starboard freeboard 98, and a converging bow freeboard 100. Similarly, base 44 and floor 66 are shaped to give the general appearance or configuration of a boat deck. Lip 82 and opening 84, which lip 82 defines, are generally shaped similar to that of floor 66. This allows lip 82 and/or elastic material 86 to pull taut outer side 54 of sidewall 42 and secure it against becoming slack.

The boat shape may be of any desired configuration. In the preferred embodiment, however, the boat is shaped similar to that of a row boat. Such a design is particularly ornamental and attractive, especially since the interior floor 66 is stretched taut from port to starboard and from bow to stern. Similarly, the material which forms sidewall enclosure 62 is stretched taut and held securely by securing means 80.

Please note that cover 46 covers, protects, holds, and retains stern freeboard 94, port freeboard 96, starboard freeboard 98, and converging bow freeboard 98 in a generally upright orientation with respect to base 44 and contributes to the general appearance of the boat.

As best seen in FIG. 5, cover 46 may further comprise a length of piping 102 which is generally positioned around an upper, outer edge 104 of sidewall 42. Piping 102 adds a decorative flare to cover 46 and can be interpreted as indicating railing about upper, outer edge 104.

If additional ornamental decoration is desired, cover 46 of pet bed 40 may further comprise a foredeck 106 located near converging bow freeboard 100. Foredeck 106 of the preferred second embodiment comprises a sheet of material identical or similar to that used for cover 46 and a thin sheet of foam-core material. The sheet of material is folded beneath and over the foam-core material such that the foam-core material is sandwiched or juxtaposed between an upper and lower surface of foredeck 106. Foredeck 106 is then cut to a desired shape and sewn or otherwise secured to upper, outer edge 104 of sidewall 42 along a fore portion of converging bow freeboard 100.

Foredeck 106 may also be provided with one or more functional and/or ornamental stitch 108 or seam spanning the width of foredeck 106 from port to starboard. FIG. 10 illustrates foredeck 106 with three straight lines of stitches 108. Stitch 108 can provide increased structural integrity to foredeck 106 by passing through and thereby joining the upper surface, foam-core material, and lower surface of foredeck 106 together.

Cover 46 of the second embodiment may also be provided with an ornamental band 110 of material spanning across floor 66 from port to starboard. Band 110 could be made of the same sheet material as foredeck 106 and cover 46. In the preferred second embodiment of the invention, floor 66 is made of an artificial sheep-skin material and the remaining portions of cover 46 are made of a nylon material. Piping 102 is made of a vinyl or rubber material.

Cover 46 may be provided with even further ornamentation in the form of one or more badges, ribbons, decals, or other indicia (not shown) which depict an anchor, a life buoy, a flag, or other boating memorabilia. Such indicia is either adhered or sewn onto outer wall covering 72 of cover 46, preferably near converging bow freeboard 100, and/or onto the upper surface of foredeck 106. Other locations may also be desirable depending upon the specific indicia selected.

Reference is now made to the third, fourth, fifth, and sixth embodiments of the present invention. Sidewall 42, base 44, cover 46, sidewall 42, and base 44 of each of these embodiments have a general appearance or configuration of an native American tepee or wigwam. Although the general structure is similar for each of these embodiments, each embodiment has different minor ornamental features. For example, the third embodiment is referred to as the deluxe cat version. The fourth embodiment is referred to as the standard cat version. The fifth embodiment is referred to as the deluxe dog version. The sixth embodiment is referred to as the standard dog version. These distinctions are not based upon anything other than appearance and possibly size. For example, in the pet industry dogs are often considered more masculine than cats. Consequently, pet beds manufactured for dogs are provided with less ornamentation. Pet beds manufactured for cats have a greater amount of ornamentation. A brief comparison of these embodiments reveals that the deluxe and standard dog versions do not have flaps 112 that are otherwise found on the cat versions of the invention. The dog versions also have a more simplistic functional and/or ornamental stitching on cover 46, as compared to similar stitching on the cat versions of the invention. The primary distinction between the deluxe and standard versions of both the cat and dog pet beds is that the deluxe version uses an artificial sheep-skin material for interior wall covering 68 of cover 46, whereas the standard versions use a similar material for both the interior wall covering 68 and for outer wall covering 72.

Referring now to FIGS. 12 through 20, which illustrate the third embodiment of the invention, base 44 is generally circular in configuration. Cover 46 and sidewall 42 are configured to form a raised, inverted, generally cone-shaped wall 114. A wider portion 116 of cone-shaped wall 114 is joined to an upper perimeter 117 of base 44 by cover 46. A narrower portion 118 forms an apex of that extends upwardly from base 44 and gives pet bed 40 the general appearance or configuration of an American Indian tepee or wigwam.

A comparison of FIG. 17 with FIG. 2 reveals the particular cross-sectional structure of cover 46 in the third embodiment with respect to the first embodiment. A close inspection reveals that most if not all of the same concepts of using: sidewall 42, base 44, cover 46, lowerside 48, interior side 50, top side 52, outer side 54, lower surface 56, side surface 58, upper surface 60, sidewall enclosure 62, base enclosure 64, floor 66, interior wall covering 68, top wall covering 70, outerwall covering 72, and means 74 for securing sidewall 42 within sidewall enclosure 62 are all included within the third embodiment of the invention. Rather than using a separate lower wall covering 76, interior wall covering 68 and outer wall covering 72 are simple sewn together against floor 66. The third embodiment of the invention also has base wall 78, securing means 80, lip 82, opening 84, elastic material 86, and edge 88 as described above. The third embodiment, however, does not have lower portion 90 and remaining portion 92 because there is no wall immediately above floor 66 at the entrance into pet enclosure 120.

An important feature of the third embodiment is that a single cone-shaped wall 114 may be used to form both the sides and the ceiling of pet bed 40. Thus, interior wall covering 68 and floor 66 define the boundaries of a pet enclosure 120. Use of a single cone-shaped wall 114 greatly simplifies the complexity of manufacture and greatly reduces the cost of manufacture.

Since a single cone-shaped wall 114 is used, a portion of a front or leading edge 122 of wall 114 is capable of being either permanently or temporarily joined together. For example, pet bed 40 may be provided with means 123 for removably fastening at least a portion of a first leading edge 124 to a corresponding portion of a second leading edge 126. Fastening means 123 may comprise a zipper, one or more buttons, snaps, clasps, or any other device which will accomplish the task. The inventor prefers that fastening means 123 comprise respective lengths 128 and 130 of a hook-and-loop fastening system, such as mating lengths of a product sold under the trademark VELCRO. Length 128 is secured to interior wall covering 68 of first leading edge 124. Similarly, length 130 is secured to interior wall covering 68 of second leading edge 126 such that when joined lengths 128 and 130 join and mesh with one another to form one or more openings into pet enclosure 120.

Figure 19:
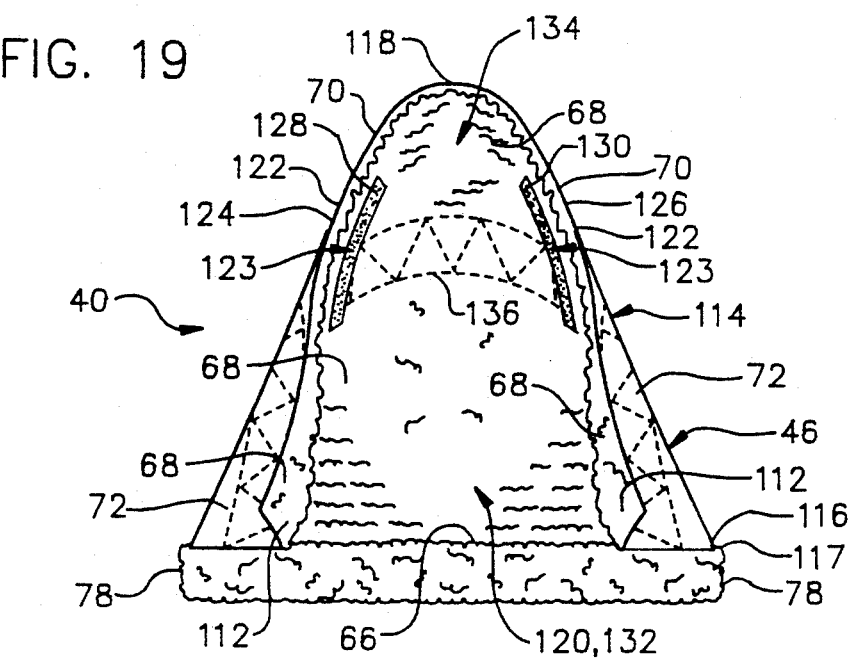
FIG. 19 is a front-elevational view of the third embodiment shown in FIG. 12 with the sides of the sidewall being separated generally to open the opening to the pet enclosure.
Figure 20:
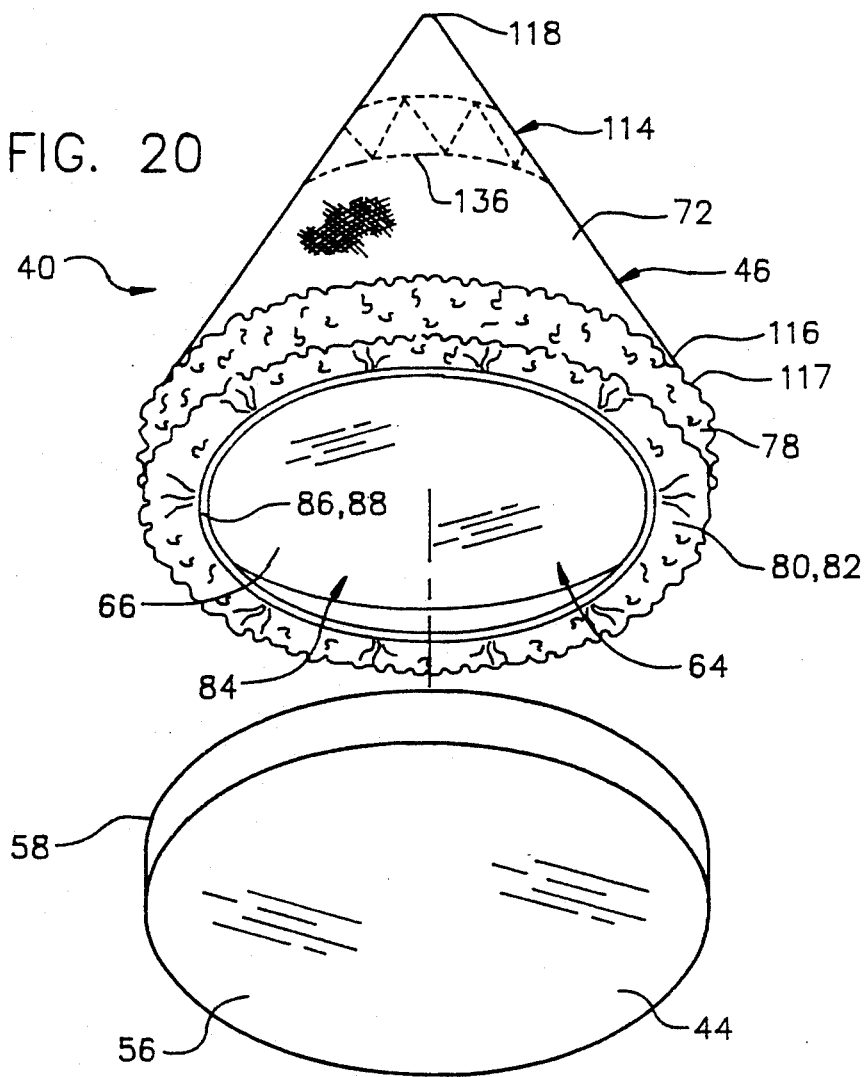
FIG. 20 is an exploded-perspective view of the third embodiment shown in FIG. 12 illustrating the removal and insertion of the base into the base enclosure of the pet bed.
Figure 21:
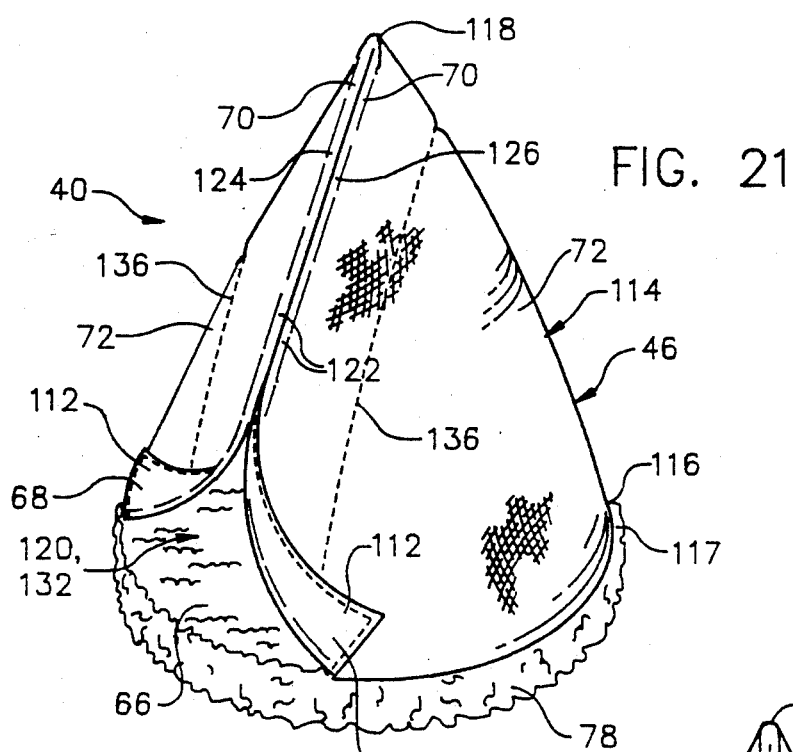
FIG. 21 is a perspective view of a fourth embodiment of the invention as taught herein with less ornamental embellishment of the sidewall.
Figure 22:
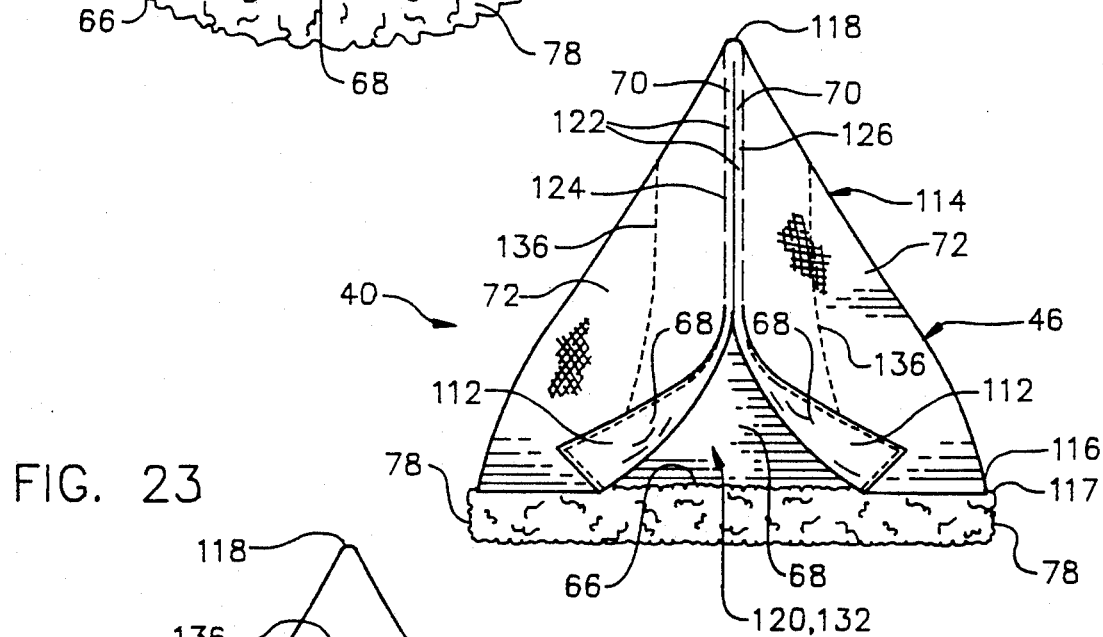
FIG. 22 is a front-elevational view of the fourth embodiment shown in FIG. 21.
Figure 23:
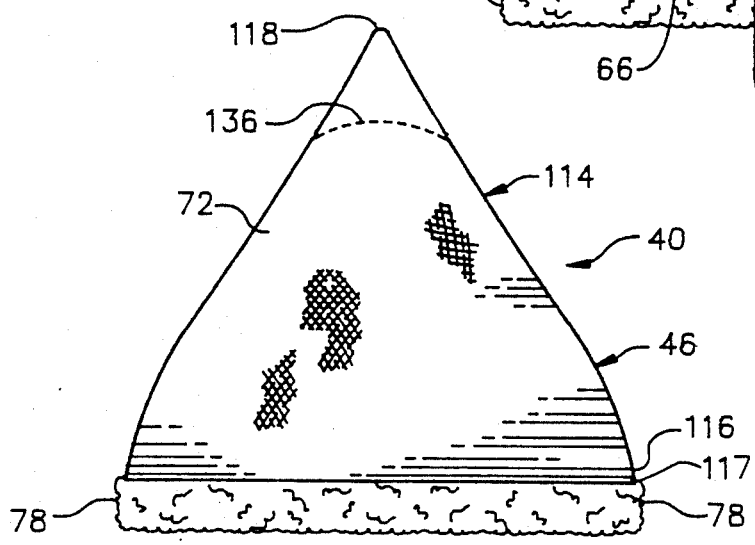
FIG. 23 is a back-elevational view of the fourth embodiment shown in FIG. 21.
Figure 24:
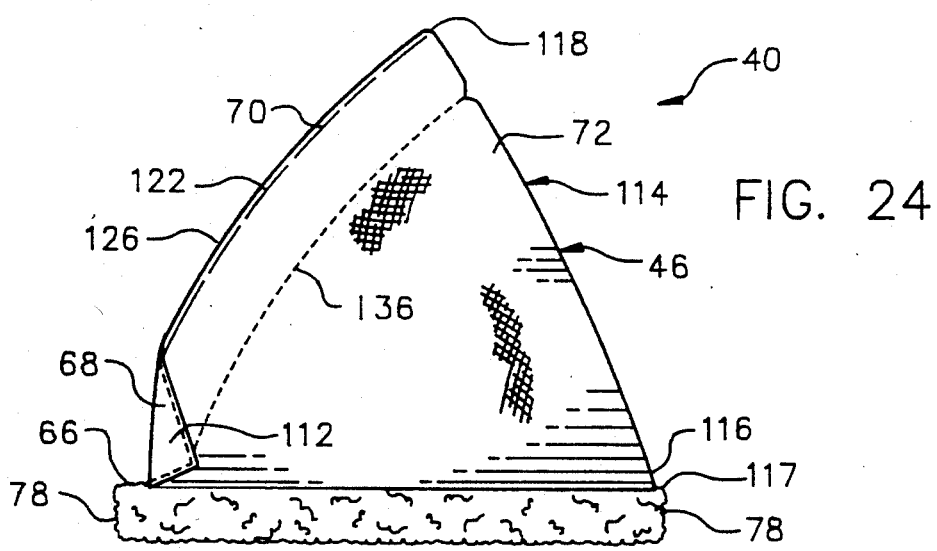
FIG. 24 is a side-elevational view of the fourth embodiment shown in FIG. 21.
Figure 25:
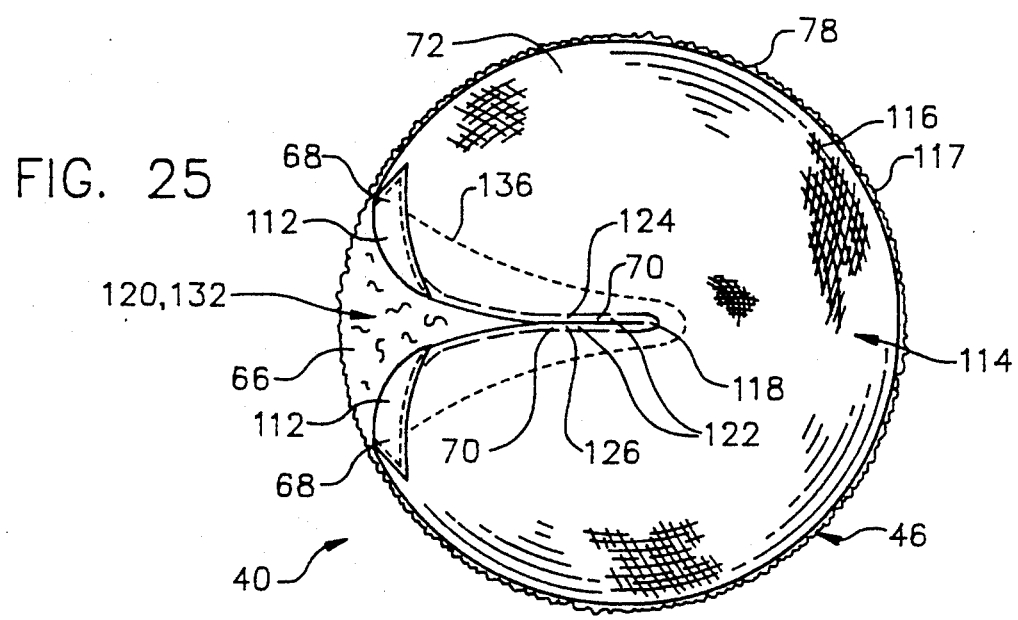
FIG. 25 is a plan view of the fourth embodiment shown in FIG. 21.
Figure 26:
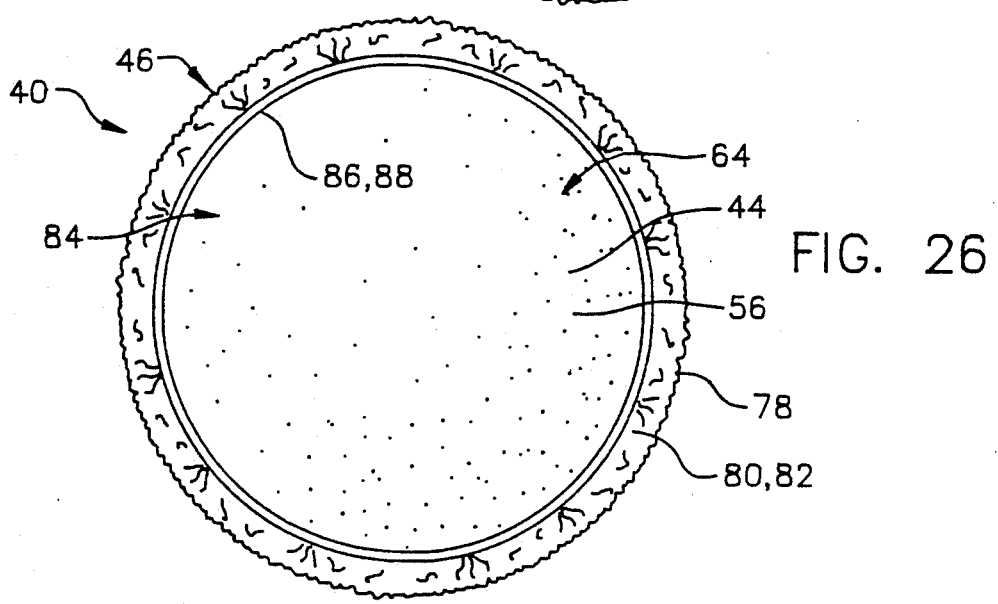
FIG. 26 is a bottom, plan view of the fourth embodiment shown in FIG. 21.
Figure 30:
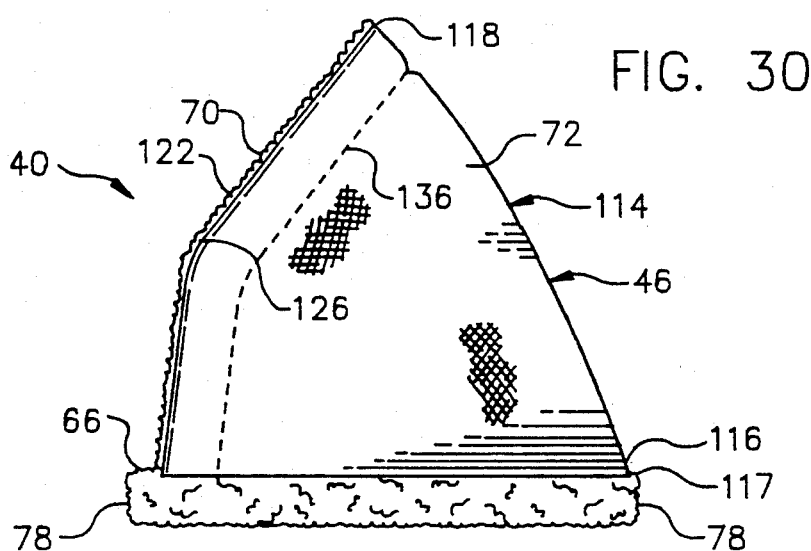
FIG. 30 is a side-elevational view of the fifth embodiment shown in FIG. 27.
Figure 31:
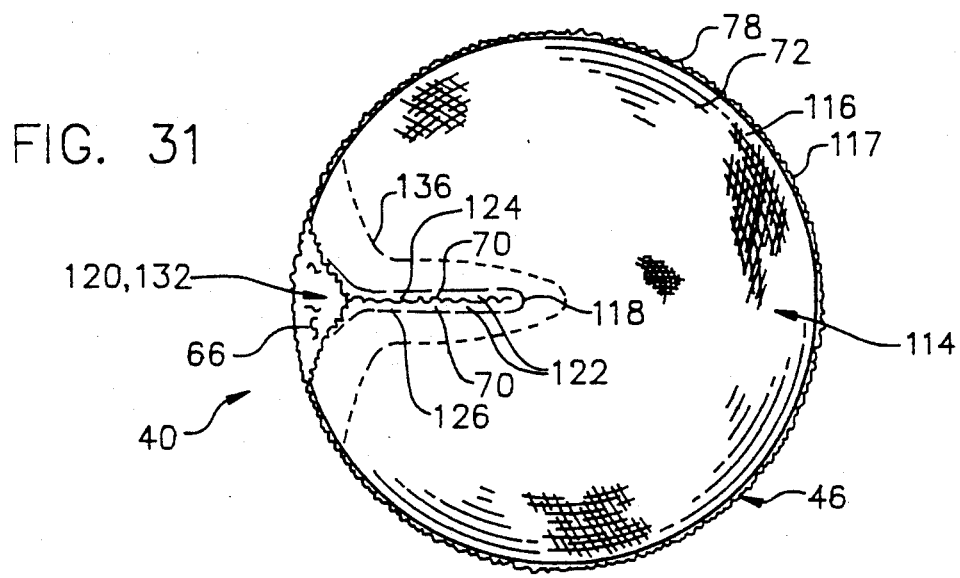
FIG. 31 is a plan view of the fifth embodiment shown in FIG. 27.
Figure 32:
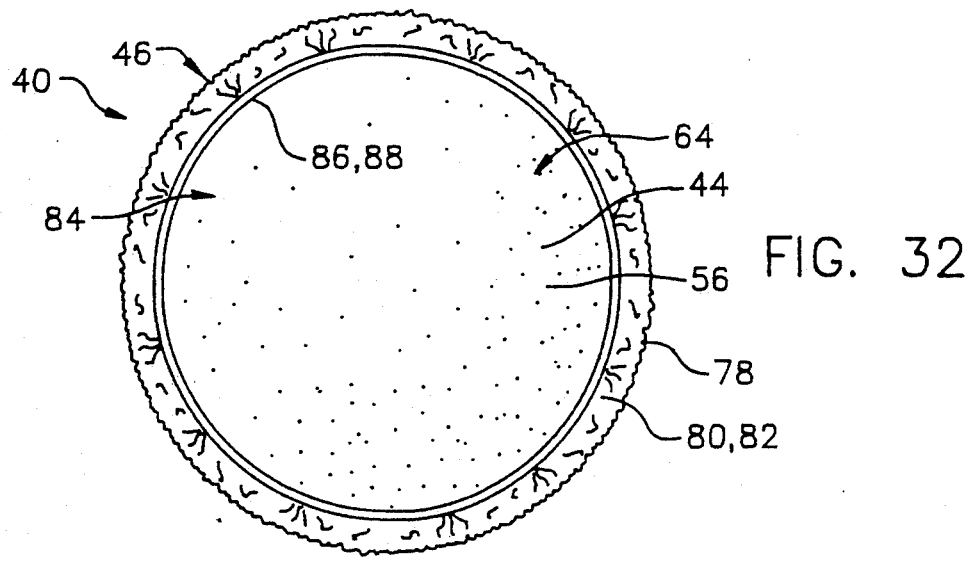
FIG. 32 is a bottom, plan view of the fifth embodiment shown in FIG. 27.
Figure 33:
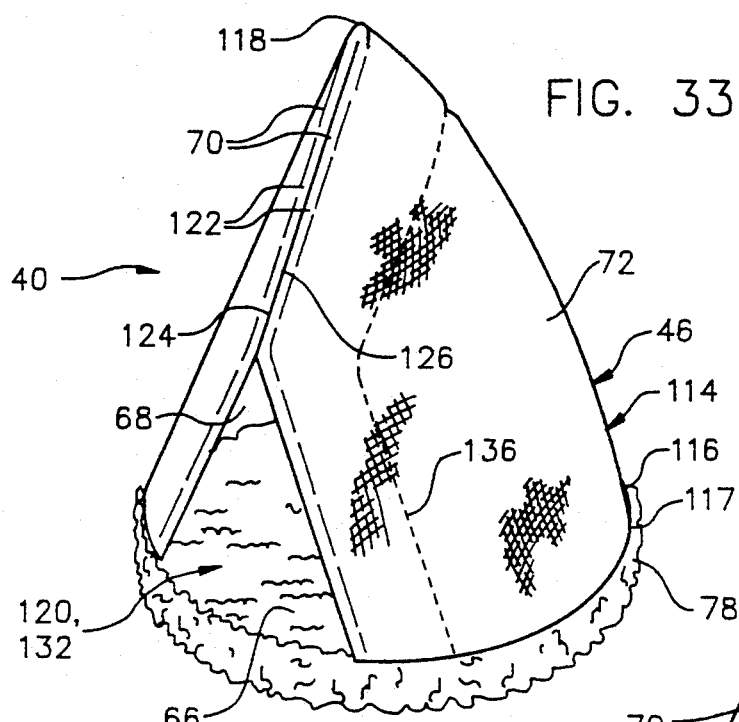
FIG. 33 is a perspective view of a sixth embodiment of the invention as taught herein.
Figure 34:
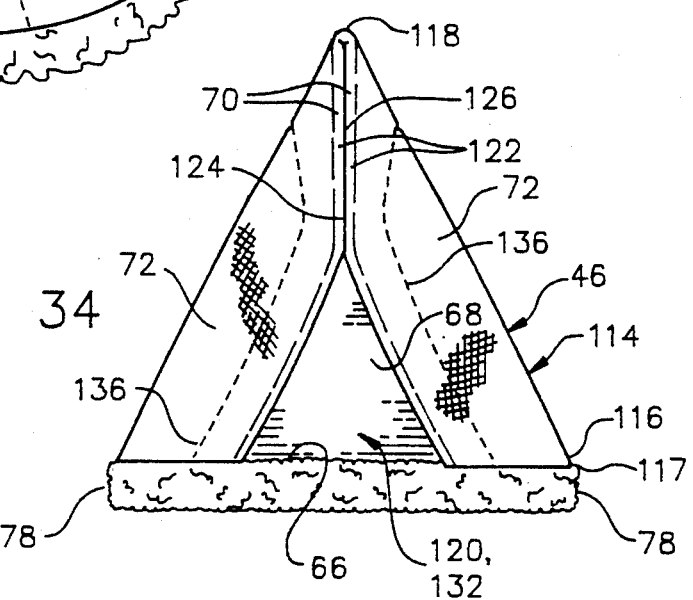
FIG. 34 is a front-elevational view of the sixth embodiment shown in FIG. 33.
Figure 35:
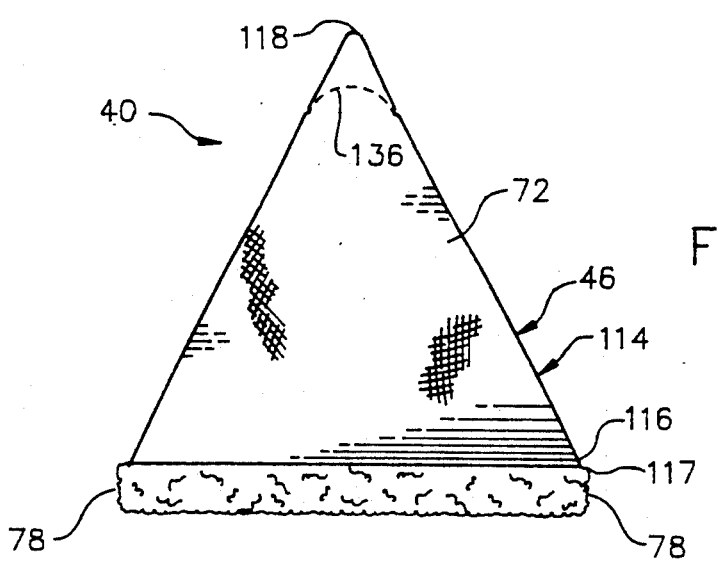
FIG. 35 is a back-elevational view of the sixth embodiment shown in FIG. 33.
Figure 36:
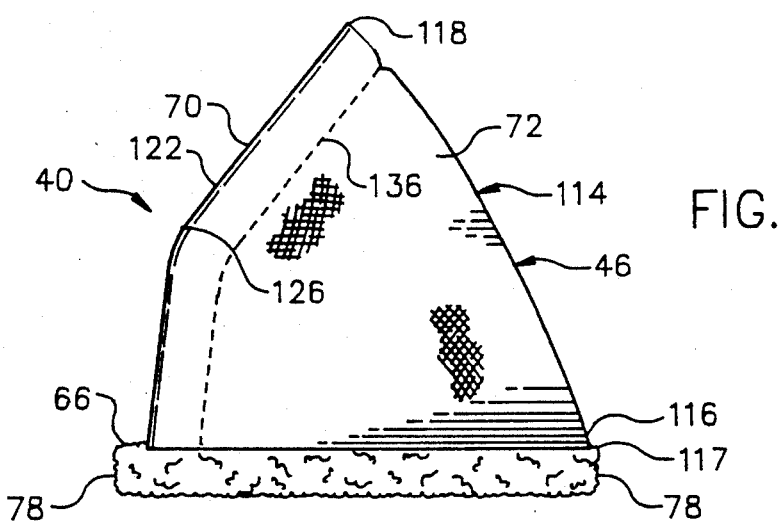
FIG. 36 is a side-elevational view of the sixth embodiment shown in FIG. 33.
Figure 37:
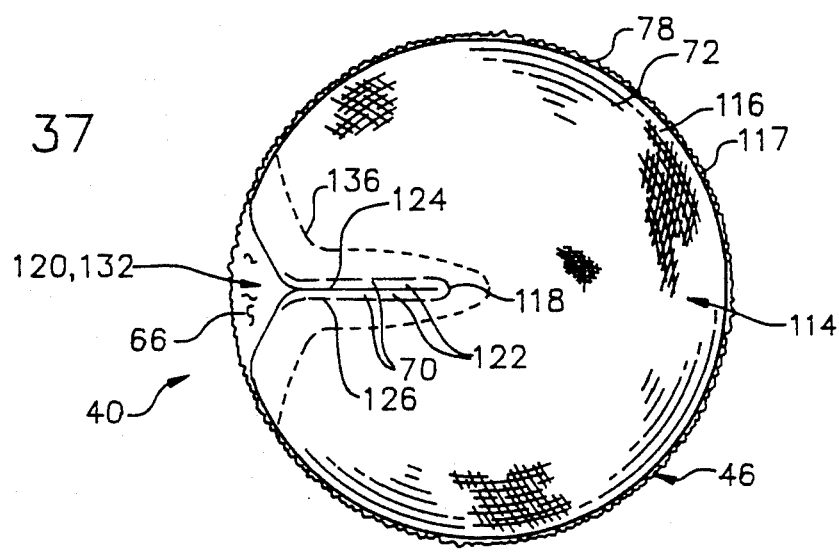
FIG. 37 is a plan view of the sixth embodiment shown in FIG. 33.
Figure 38:
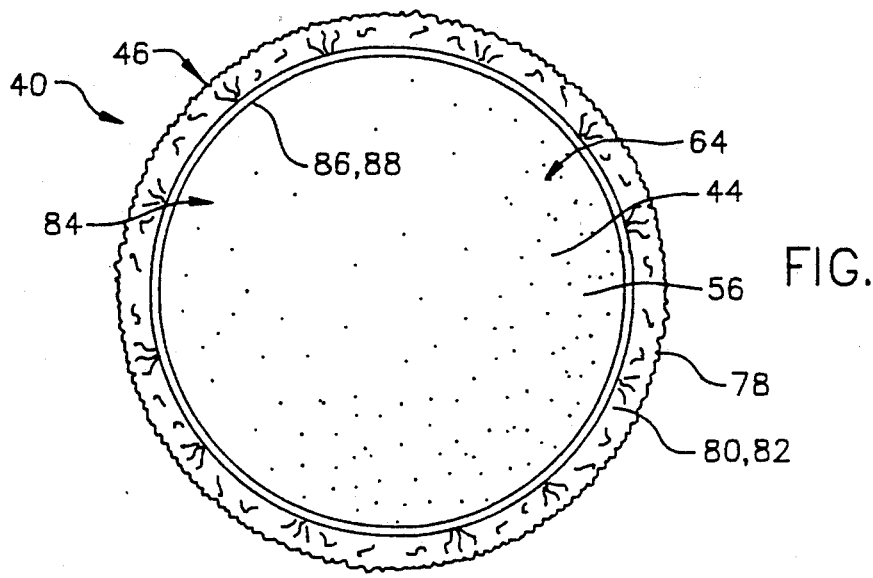
FIG. 38 is a bottom, plan view of the sixth embodiment shown in FIG. 33.
Figure 39:
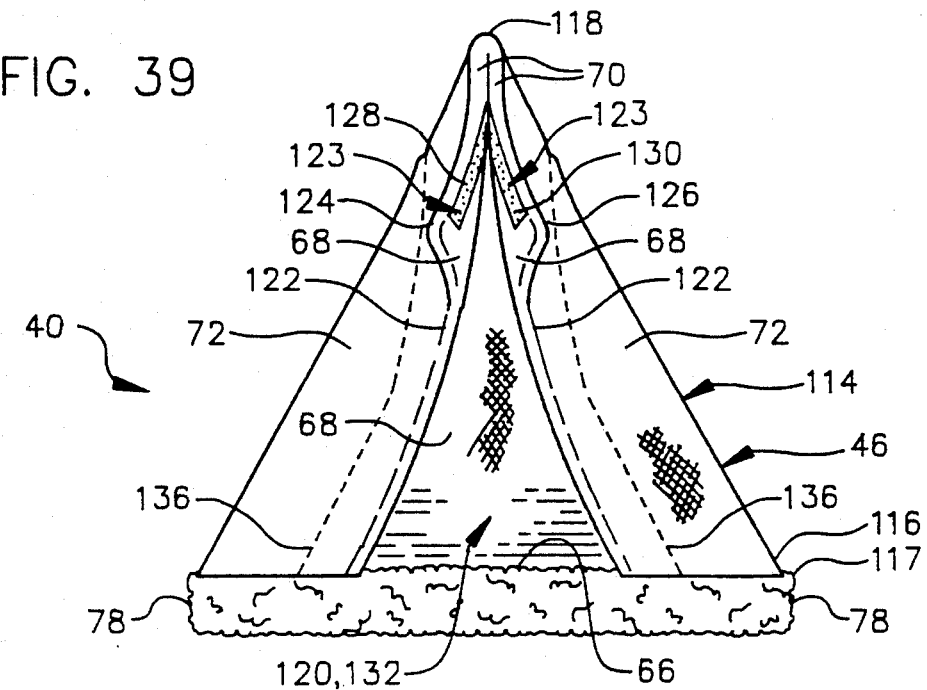
FIG. 39 is a front-elevational view of the sixth embodiment shown in FIG. 3 with the first and second leading edges of the sidewall being partially separated to illustrate the separable attachment of the first and second leading edges.
Figure 40:
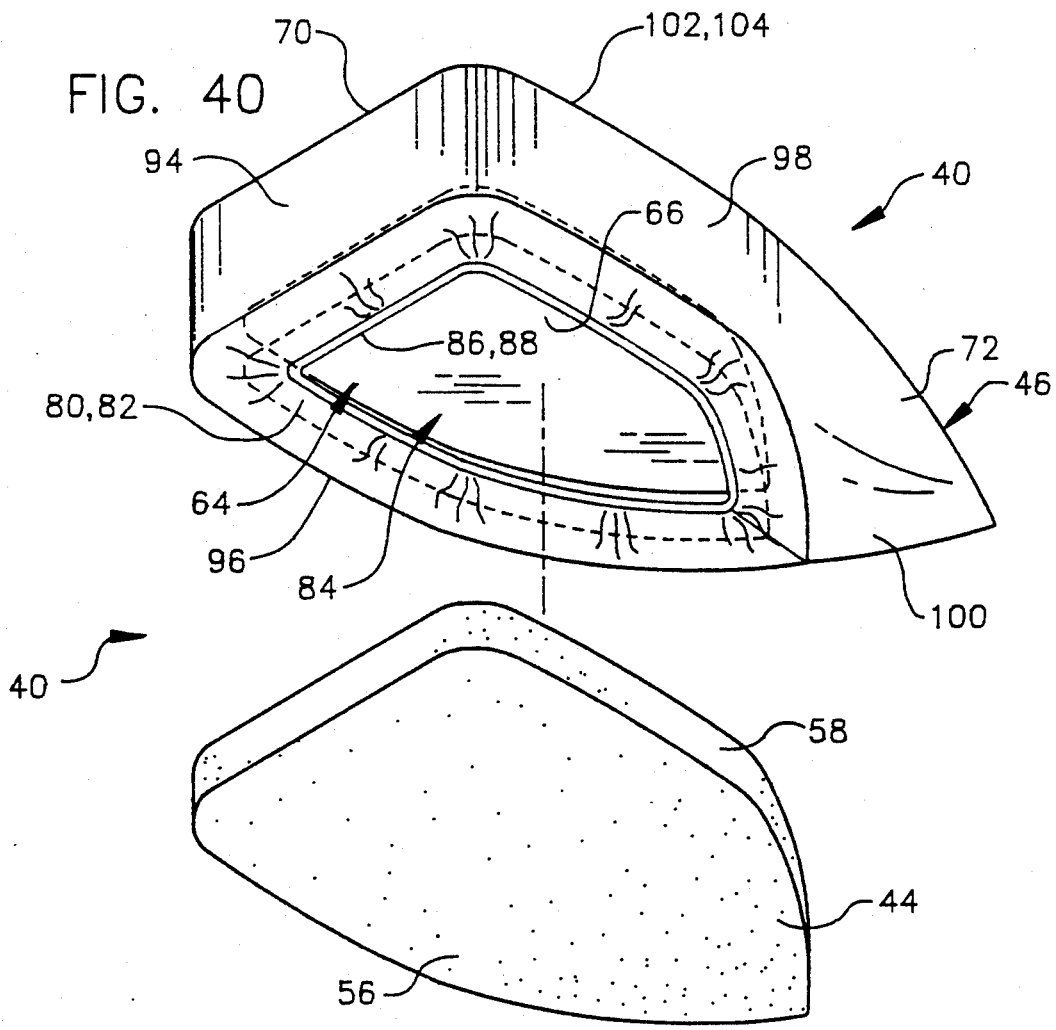
FIG. 40 is an exploded-perspective view of the second embodiment shown in FIG. 5 illustrating the removal and insertion of the base into the base enclosure of the cover.

FIGS. 17, 19 and 39 illustrate the preferred placement of lengths 128 and/or 130. One of several reasons for, and benefits of, this placement is that a pet, such as a cat, can enter or leave pet enclosure 120 through either a first opening 132, located below fastening means 123, or through a second opening 134, located above fastening means 123. Use of a hook-and-loop fastening means 123 also enables the size of first opening 132 and second opening 134 to be adjusted. If both first opening 132 and second opening 134 are used, such structure not only allows stuffy spent air naturally to escape through such openings, but also permits fresh air to flow through pet enclosure 120 by being drawn therein as the pet enters and/or leaves the enclosure. Due to the generally porous nature of sidewall 42 and cover 46, pet bed 40 is capable of breathing or allowing air to pass therethrough. This feature is significantly different from pet shelters having hard, nonporous walls.

As briefly mentioned above, the front or leading edge 122 of the third and fourth embodiments of the invention may be provided with one or more functional and/or ornamental door flaps 112 that are located near first opening 132 of pet enclosure 120. Flaps 112 are preferably extensions of first leading edge 124 and second leading edge 126 which are folded outwardly and back against outer wall covering 72 of cover 46. Flaps 112 may then be either permanently or temporarily fastened to outer wall covering 72. The inventor prefers that flaps 112 are permanently secured in place to serve simply as decorative adornment for pet bed 40. Alternatively, flaps 112 may be detachable from outer wall covering 72 and be joined together to at least partially close first opening 132. Another alternative is to use flaps 112 which are at least initially independent of cover 40 that are either permanently or temporarily affixed to cover 40.

Cover 46 and sidewall 42 of the third embodiment may also have one or more functional and/or ornamental side stitch 136 or seam that bind outer wall covering 72 to sidewall 42 and to interior wall covering 68. As seen in FIGS. 12 through 15 and 17 through 20, side stitch 136 may comprise a series of straight stitches that give the appearance from a distance of an enlarged zig-zag stitch hemmed with a straight stitch along each side of the zig-zag stitch. Other stitch designs or patterns can be used with similar aesthetic impact and effect.

The fourth embodiment of pet bed 40, as illustrated in FIGS. 21 through 26, is similar to the third embodiment except that an artificial sheepskin material is not used for the interior wall covering 68 and flaps 112, and a single straight stitch is used for side stitch 136.

In most respects the fifth embodiment of pet bed 40, as illustrated in FIGS. 27 through 32, is also similar to the third embodiment of the invention, except that: an artificial sheepskin material is not used for the interior wall covering 68; a single straight stitch is used for side stitch 136; and no flaps 112 are used.

The sixth embodiment of pet bed 40, as illustrated in FIGS. 33 through 39, is very similar to the fifth embodiment of the invention except that an artificial sheepskin material is not used for the interior wall covering 68.

In summary, the present invention is not restricted to a particular configuration. To the contrary, the invention may comprise a traditional oval pet bed design, a novel and unique boat configuration, any one of a wide variety of tepee configurations, or other configuration which uses the same concepts and features as taught herein. The primarily claimed invention is use of a sidewall, a removable base, and a cover having separate and distinct compartments or enclosures for the sidewall and the base. From this broad concept and structure, many different more detailed and structured embodiments can be created. The illustrated embodiments are only illustrative. Many other designs may be used with the claimed invention.

The means and construction disclosed herein are by way of example and comprise primarily the preferred forms of putting the invention into effect. Although the drawings depict a preferred and alternative embodiments of the invention, other embodiments have been described within the preceding text. One skilled in the art will appreciate that the disclosed device may have a wide variety of shapes and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its forms, including all modifications, equivalents, and alternative embodiments which fall within the legitimate and valid scope of the appended claims, appropriately interpreted under the Doctrine of Equivalents.

INDUSTRIAL APPLICABILITY

The present invention provides a simple, reliable, easily used apparatus and method to form a soft, flexible, padded pet bed. The apparatus of this invention is also compact, functional, unobtrusive, efficient, reusable, durable, rugged, is easily constructed, and is inexpensive and economical to manufacture. Traditional or nontraditional manufacturing processes may be used. The present invention not only increases the speed and simplifies the procedure to form a pet bed, it also provides an apparatus which requires less storage room and shipping packaging and expense without damaging the product. This invention also allows a wide variety of differently styled pet beds to be manufactured.

The industrial applicability of this invention can be more readily ascertained by reference to the following example of its use.

Once the cover is manufactured, the soft, flexible, foam-core sidewall is inserted into the sidewall enclosure of the cover. The sidewall is manipulated within the enclosure to place it in its proper position and orientation. The sidewall within the cover is urged to collapse upon itself to assume a generally flat compact form. Once collapsed, the base is combined with the flattened sidewall and cover. The base, flattened sidewall, and cover are then easily inserted into a protective plastic shipping bag and into a generally flat, cardboard shipping container. The product may then be shipped to distributors, wholesalers, retailers, or directly to end customers.

Upon receipt of the contained product, the pet bed is removed from its protective container and plastic shipping bag. The flattened sidewall and cover are allowed to resume their naturally expanded open position.

The base is then inserted into an opening in the base enclosure. The insertion of the base into the base enclosure stretches the floor of the cover taut for a smooth and extremely appealing and professional appearance.

If the product comprises the third or fourth embodiments as described above, the front or leading edges of the sidewall are joined generally to close the opening into the interior of the pet enclosure.

The product is now ready to be laid down where desired and used by a pet.

If the cover, sidewall, and/or base become soiled, the base may be simply removed from the base enclosure of the cover and one or more of these elements may be washed. Depending upon whether or not the sidewall is permanently or removably placed within the sidewall enclosure, the sidewall may also be removed for cleaning.

What is claimed is:

1. A soft, flexible pet bed, comprising:
a soft, flexible floor, and
at least one sidewall above and affixed to said floor made of a soft, flexible material yet sufficiently rigid to form a generally erect intended configuration above said floor; and
a base, said floor forming a cover for said base generally in the form of a bag having an opening, said base being easily inserted into or removed from said bag through said opening while said floor is affixed to said sidewall, said bed being collapsible to a generally compact form for ease of shipping and machine-washing when said base is removed, said base maintaining said intended configuration of the bed for use by the pet when the base is inserted into the floor.

2. The pet bed of claim 1, wherein said floor is sized so that when the base is inserted into the bag, the floor becomes generally taut over the top surface of said base, which in turn urges said sidewall to form and maintain the intended configuration of the bed for use by the pet.

3. The pet bed of claim 2, wherein said floor further comprises a means for urging said bag opening toward at least partial closure in order to hold the floor taut around said base.

4. The pet bed of claim 1, wherein said sidewall is made from a porous material which allows the passage of air through said sidewall.

5. The pet bed of claim 4, wherein said sidewall is formed from a foam-core material.

6. The pet bed of claim 4, wherein said sidewall is covered by a sidewall cover made from a washable material.

7. The pet bed of claim 6, wherein said sidewall cover is removable from said sidewall.

8. The pet bed of claim 1, wherein said base is formed from a foam-core material.

9. The pet bed of claim 1, wherein said sidewall extends only partially around the periphery of said floor thereby having two leading edges, further comprising fastening means for removably securing one leading edge of said sidewall to the other leading edge thereof in order to form at least a partial enclosure for sheltering the pet.

10. The pet bed of claim 6, wherein said fastening means comprises a hook and loop fastening system.

11. The pet bed of claim 6 wherein said sidewall is sized so that when the leading edges thereof are secured to each other, a complete enclosure is formed except for an opening suitable for ingress and egress of the pet.

12. A soft, flexible pet bed comprising:
a base;
at least one sidewall which is flexible yet able to maintain a generally erect configuration above said base; and
a base enclosure, affixed to said sidewall, having an opening through which said base may be easily inserted and removed from said base enclosure, said base enclosure having means for urging said opening toward at least partial closure when the base is inserted therein in order to hole the base enclosure generally taut around said base and maintain the sidewall in said generally erect configuration, said base enclosure and said sidewall being collapsible to a compact form for ease of shipping and machine-washing when said base is removed from said base enclosure.

13. A pet bed comprising:
a shelter portion comprising:
(a) a soft, flexible floor, and
(b) at least one sidewall made of a soft, flexible material, said sidewall being affixed to said floor at least partially around the floor's periphery, said sidewall being sized and sufficiently rigid to form at least a generally erect partial enclosure above said floor within which said pet sleeps; and
a base, said floor forming a cover for said base generally in the form of a bag having an opening, said base being easily inserted into or removed from said bag through said opening such that when the base is removed from the bag, the shelter portion is collapsible to a generally compact form for ease of shipping and machine-washing, and the floor being sized so that when the base is inserted into the bag, the floor becomes generally taut over the top surface of said base, which in turn urges said sidewall to form and maintain the intended configuration of said shelter portion enclosure for use by the pet.

14. The pet bed of claim 13, wherein said floor further comprises a means for urging said opening toward at least partial closure in order to hold the floor taut around said base.

15. The pet bed of claim 14, wherein said means for urging said opening toward at least partial closure comprises an elastic material attached to said floor and positioned around the opening of said floor.

16. The pet bed of claim 13, wherein said shelter portion enclosure is a complete enclosure having ingress and egress means for the pet.

17. The pet bed of claim 13, wherein said sidewall extends only partially around the periphery of said floor thereby having two leading edges, further comprising fastening means for removably securing one leading edge of said sidewall to the other leading edge thereof in order to form at least a partial enclosure for sheltering the pet.

18. The pet bed of claim 17, wherein said fastening means comprises a hook and loop fastening system.

19. The pet bed of claim 17 wherein said sidewall is sized so that when the leading edges thereof are secured to each other, a complete enclosure is formed except for an opening suitable for ingress and egress of the pet.

* * * * *

UNITED STATES PATENT AND TRADEMARK OFFICE
CERTIFICATE OF CORRECTION

PATENT NO. : 5,136,981

DATED : August 11, 1992

INVENTOR(S) : Aurelio F. Barreto, III, et al.

It is certified that error appears in the above-identified patent and that said Letters Patent is hereby corrected as shown below:

Column 1, line 29, delete "contain" and insert therefor --contains--.

Column 1, line 53, delete "," after "cover".

Column 1, lines 58-59, delete "side walls" and insert therefor --sidewalls--.

Column 2, line 48, delete "Aug. 9," and insert therefor --Aug. 29,--.

Column 3, lines 4-5, delete "well being" and insert therefor --well-being--.

Column 3, line 12, delete "have" and insert therefor --has--.

Column 3, line 14, delete "below mentioned" and insert therefor --below-mentioned--.

Column 3, line 28, insert --,-- between "use" and "requiring".

Column 3, line 35, delete "are" and insert therefor --is--.

Column 3, line 43, delete "hollowcored" and insert therefor --hollow-cored--.

Col. 3, line 66, insert --least-- between "at" and "partially".

Column 4, lines 17-18, insert --the-- between "of" and "base".

UNITED STATES PATENT AND TRADEMARK OFFICE
CERTIFICATE OF CORRECTION

PATENT NO. : 5,136,981

DATED : August 11, 1992

INVENTOR(S) : Aurelio F. Barreto, III, et al.

It is certified that error appears in the above-identified patent and that said Letters Patent is hereby corrected as shown below:

Column 4, line 41, delete "be" and insert therefor --bed--.

Column 4, line 48, delete "aesthetically appealing" and insert therefor --aesthetically-appealing--.

Column 7, line 16, delete "than" and insert therefor --that--.

Column 7, line 40, delete "74" and insert therefor --42--.

Column 7, line 41, delete "74" and insert therefor --42--.

Column 7, line 43, delete "74" and insert therefor --42--.

Column 9, line 5, second occurrence, delete "98" and insert therefor --100--.

Column 9, line 55, delete "sidewall 42, and base 44".

Column 9, line 55, insert --and-- between "44," and "cover".

Column 9, line 57, delete "native" and insert therefor --Native--.

Column 10, line 23, delete "of".

Column 10, line 39, delete "simple" and insert therefor --simply--.

Column 11, line 38, delete "40" and insert therefor --46--.

Column 11, line 39, delete "40" and insert therefor --46--.

UNITED STATES PATENT AND TRADEMARK OFFICE
CERTIFICATE OF CORRECTION

PATENT NO. : 5,136,981          Page 3 of 3
DATED      : August 11, 1992
INVENTOR(S): Aurelio F. Barreto, III, et al.

It is certified that error appears in the above-identified patent and that said Letters Patent is hereby corrected as shown below:

Column 12, line 2, insert --any-- between "or" and "other".

Column 12, line 4, delete "primarily" and insert therefor --primary--.

Col. 13, claim 10, line 63, delete "6" and insert --9--

Col, 13, claim 11, line 65, delete "6" and insert --9--.

Col. 14, claim 12, line 13, delete "hole" and insert --hold--

Signed and Sealed this

Fourteenth Day of September, 1993

Attest:

BRUCE LEHMAN

*Attesting Officer*          *Commissioner of Patents and Trademarks*